(12) United States Patent
Shin

(10) Patent No.: US 12,427,884 B2
(45) Date of Patent: Sep. 30, 2025

(54) METHOD AND DEVICE FOR SUPPORTING INSTALLATION OF CONTRACT CERTIFICATE FOR ELECTRIC VEHICLE

(71) Applicants: Hyundai Motor Company, Seoul (KR); Kia Corporation, Seoul (KR); Myongji University Industry and Academia Cooperation Foundation, Gyeonggi-do (KR)

(72) Inventor: Min Ho Shin, Gyeonggi-do (KR)

(73) Assignees: Hyundai Motor Company, Seoul (KR); Kia Corporation, Seoul (KR); Myongji University Industry and Academia Cooperation Foundation, Gyeonggi-do (KR)

( * ) Notice: Subject to any disclaimer, the term of this patent is extended or adjusted under 35 U.S.C. 154(b) by 470 days.

(21) Appl. No.: 17/797,591

(22) PCT Filed: Feb. 3, 2021

(86) PCT No.: PCT/KR2021/001437
§ 371 (c)(1),
(2) Date: Aug. 4, 2022

(87) PCT Pub. No.: WO2021/158021
PCT Pub. Date: Aug. 12, 2021

(65) Prior Publication Data
US 2023/0057752 A1     Feb. 23, 2023

Related U.S. Application Data

(60) Provisional application No. 62/970,777, filed on Feb. 6, 2020.

(51) Int. Cl.
*B60L 53/66*    (2019.01)
*B60L 53/62*    (2019.01)
*B60L 53/63*    (2019.01)

(52) U.S. Cl.
CPC ............... *B60L 53/66* (2019.02); *B60L 53/62* (2019.02); *B60L 53/63* (2019.02)

(58) Field of Classification Search
None
See application file for complete search history.

(56) References Cited

U.S. PATENT DOCUMENTS 10,336,206 B2 *   7/2019   Uyeki ...................... B60L 53/63
10,957,146 B2 *   3/2021   Bartlett ................ G06Q 20/145
(Continued)

FOREIGN PATENT DOCUMENTS

KR        101810325 B1     1/2018
KR        2018-0086934 A   8/2018
(Continued)

OTHER PUBLICATIONS

"Exploring the Public Key Infrastructure for ISO 15118 in the EV Charging Ecosystem", Oct. 15-16, Arnhem, The Netherlands, ElaadNL, Nov. 2018, version 1.0, 88 pages.
(Continued)

*Primary Examiner* — Jonathan M Dager
(74) *Attorney, Agent, or Firm* — FOX Rothschild LLP

(57) ABSTRACT

The present disclosure provides a method for supporting installation of a contract certificate by a charging service providing device. As an example, the present disclosure may comprise the steps of: generating a first contract certificate for a first electric vehicle (EV); and transmitting the first contract certificate to a first external charging service providing device (CSP) with which a roaming contract has been made, so as to enable the first contract certificate to be installed in the first EV via the first external CSP in a roaming situation.

20 Claims, 16 Drawing Sheets

(56) References Cited

U.S. PATENT DOCUMENTS

| | | | |
|---|---|---|---|
| 11,110,814 B2* | 9/2021 | Straßer | B60L 53/14 |
| 11,477,647 B1* | 10/2022 | Srinath Bharadwaj | H04L 9/0894 |
| 11,518,245 B2* | 12/2022 | Penilla | G06Q 20/102 |
| 11,715,138 B2* | 8/2023 | Khoo | G06Q 30/0206 700/286 |
| 11,727,106 B2* | 8/2023 | Shin | B60L 53/66 713/168 |
| 11,748,816 B1* | 9/2023 | Thurber | G06Q 40/08 705/4 |
| 11,937,082 B1* | 3/2024 | Srinath Bharadwaj | H04L 9/3297 |
| 12,132,332 B2* | 10/2024 | Shin | B60L 53/305 |
| 2009/0021213 A1* | 1/2009 | Johnson | B60L 53/665 320/109 |
| 2009/0063680 A1* | 3/2009 | Bridges | B60L 53/20 709/224 |
| 2009/0210357 A1* | 8/2009 | Pudar | B60L 53/65 705/412 |
| 2010/0141203 A1* | 6/2010 | Graziano | B60L 53/18 320/109 |
| 2010/0145837 A1* | 6/2010 | Graziano | G06Q 50/40 705/412 |
| 2010/0161482 A1* | 6/2010 | Littrell | B60L 53/67 705/40 |
| 2010/0256846 A1* | 10/2010 | Shaffer | G06Q 10/06 701/22 |
| 2011/0099111 A1* | 4/2011 | Levy | G06Q 50/06 705/14.1 |
| 2011/0144844 A1* | 6/2011 | Ishibashi | H02J 7/04 320/109 |
| 2011/0153474 A1* | 6/2011 | Tormey | G06Q 30/04 709/204 |
| 2011/0191265 A1* | 8/2011 | Lowenthal | B60L 53/665 705/412 |
| 2012/0049785 A1* | 3/2012 | Tanaka | B60L 53/305 320/106 |
| 2012/0112697 A1* | 5/2012 | Heuer | B60L 53/60 320/109 |
| 2013/0119920 A1* | 5/2013 | Hsu | B60L 53/665 320/109 |
| 2013/0138542 A1* | 5/2013 | Sirton | B60L 53/66 700/297 |
| 2013/0293349 A1* | 11/2013 | Templ | G07F 15/005 340/5.61 |
| 2018/0336551 A1* | 11/2018 | Mouftah | H04L 9/3213 |
| 2018/0354382 A1* | 12/2018 | Schlaudraff | B60L 53/12 |
| 2019/0355072 A1* | 11/2019 | Amano | B60L 53/68 |
| 2020/0148071 A1* | 5/2020 | Singh | B60L 53/665 |
| 2020/0164759 A1* | 5/2020 | Heuer | B60L 53/68 |
| 2021/0149355 A1* | 5/2021 | Yamaguchi | H04W 12/71 |
| 2021/0158459 A1* | 5/2021 | Verma | G06Q 20/202 |
| 2022/0012647 A1* | 1/2022 | Lee | B60L 53/305 |
| 2022/0069602 A1* | 3/2022 | Shin | B60L 53/665 |
| 2022/0158851 A1* | 5/2022 | Shin | G06Q 50/40 |
| 2022/0212559 A1* | 7/2022 | Shin | B60L 53/665 |
| 2022/0332210 A1* | 10/2022 | Goei | B60L 53/53 |
| 2022/0405743 A1* | 12/2022 | Kohlbrenner | G06Q 30/0601 |
| 2023/0030673 A1* | 2/2023 | Yasmin | H04L 63/0823 |
| 2023/0274584 A1* | 8/2023 | Dunger | G07F 15/008 705/13 |
| 2023/0365007 A1* | 11/2023 | Shin | B60L 53/66 |
| 2023/0402854 A1* | 12/2023 | Nagaoka | H04L 63/0823 |
| 2024/0010095 A1* | 1/2024 | Shin | G06Q 50/06 |
| 2024/0020667 A1* | 1/2024 | Allamsetty | G06Q 50/40 |
| 2024/0121110 A1* | 4/2024 | Shin | G06Q 30/018 |
| 2024/0217374 A1* | 7/2024 | Yeo | B60L 53/68 |
| 2024/0262235 A1* | 8/2024 | Fukuoka | B60L 53/63 |
| 2024/0300372 A1* | 9/2024 | Misawa | B60L 58/12 |

FOREIGN PATENT DOCUMENTS

| | | |
|---|---|---|
| KR | 2019-0081757 A | 7/2019 |
| WO | 2014-075889 A2 | 5/2014 |
| WO | 2019-072011 A1 | 4/2019 |

OTHER PUBLICATIONS

G. Bernard, "Recommendation on communication security for roaming electric vehicle charging", PKI architechtures related to ISO 15118 charging station-vehicle communication standard, AFIREV, Nov. 1, 2019, 42 pages.

* cited by examiner

METHOD AND DEVICE FOR SUPPORTING INSTALLATION OF CONTRACT CERTIFICATE FOR ELECTRIC VEHICLE

CROSS-REFERENCE TO RELATED APPLICATIONS

The present application is a U.S. National Phase application under 35 U.S.C. § 371 of International application No. PCT/KR2021/001437 filed on Feb. 3, 2021, which claims under 35 U.S.C. § 119(e) the benefit of U.S. Provisional Application No. 62/970,777 filed on Feb. 6, 2020, the entire contents of which are incorporated by reference herein.

TECHNICAL FIELD

The present disclosure relates to a method of charging an electric vehicle and a device therefor. More particularly, the present disclosure relates to a method and device for installing a public key certificate in an electric vehicle to adapt to a roaming environment in a PnC-based charging infrastructure.

BACKGROUND

An electric vehicle (EV) is driven by an electric motor powered by a battery and has advantages of reducing pollutants such as exhaust gas and noise, less breakdown, longer life, and simpler driving operation compared with a conventional combustion engine vehicle. An electric vehicle charging system may be defined as a system that charges a battery mounted in an electric vehicle using electric power obtained from a commercial power grid or stored in an energy storage device. Such an electric vehicle charging system may be implemented in various forms. For example, the electric vehicle charging system may include a conductive charging system using a cable or a non-contact wireless power transfer system.

A charging station starts the charging for an EV after performing an authentication process. However, the authentication process varies depending on a charging infrastructure and functionalities of the EV. ISO 15118-1 which is one of the international standards for the EV charging specifies two authentication methods: the PnC mechanism allowing an automatic authentication and payment using a contract certificate stored in the EV, and an authentication using external identification means (EIM) such as a credit card, a debit card, cash, and a smartphone application. The PnC mechanism refers to plug-and-charge scheme by which the authentication and charging are performed by simply inserting a plug between the EV and the charging station while referring to a park-and-charging scheme by which the authentication and charging are performed by simply parking the vehicle over a charging spot of the charging station. In order for an EV to use the PnC service, the EV owner has to conclude a service use contract with a Mobility Operator (MO). After a contract conclusion, the contract certificate is installed in the EV at the time of an initial charging. Afterwards, the EV may receive the PnC-based charging service from charging stations associated with the MO. In the case where the EV is to receive PnC-based charging service from a charging station associated with another MO having no contractual relationship, a roaming may occur. As long as a valid contract certificate is installed already in the EV, the EV owner has little difficulty in using the charging service in a roaming environment.

However, if the EV visiting a charging station does not have a valid contract certificate, the PnC mechanism may not work. Such a situation may occur, for example, when the first charging station visited by the EV after a vehicle delivery is a charging station belonging to a network of an MO having no contractual relationship with the EV. In addition, the PnC mechanism may not work when the contract certificate installed in the EV cannot operate normally for some reason and has to be updated. Thus, there may be situations where the installation or update of the contract certificate is required in the roaming environment, but conventional charging systems may have no countermeasure for this problem. Accordingly, when the PnC mechanism does not work as described above, the EV driver has to pay a charging tariff by the EIM, which is cumbersome and inconvenient for the EV driver.

Meanwhile, according to the conventional PnC mechanism, a charging station operator (CSO) or a charge service provider (CSP) validates a contract certificate chain submitted by the EV to the CSO via the charging station. Since, however, the EV is not equipped with an MO RootCA Certificate which is a highest level certificate in the contract certificate chain (based on ISO 15118-20 standard dated Jul. 2, 2018), the EV cannot submit the MO RootCA Certificate to a visited CSO. If neither the visited CSO nor a visited CSP is equipped with this RootCA certificate, the validation may be performed only at a home CSP or a separate clearing house, which may cause an authentication delay.

SUMMARY

Provided are a method and device for enabling an installation or update of the contract certificate in the EV in a roaming environment and facilitating an accurate and speedy authentication required for the PnC-based charging.

According to an aspect of the present disclosure, a method is provided of supporting an installation of a contract certificate in a charging service providing device. The method includes: generating a first contract certificate for a first electric vehicle (EV); and transmitting the first contract certificate to a first external charging service providing device (CSP) in which a roaming contract has been established, so as to enable the first contract certificate to be installed in the first EV via the first external CSP in a roaming situation.

The first external CSP may include all external CSPs having respective roaming contracts with the charging service providing device.

The first external CSP may include all external CSPs.

The method may further include: sending a request to release an installation standby to the first external CSP when a predetermined time elapsed after transmitting the first contract certificate to the first external CSP or when the first contract certificate is installed in the first EV.

The operation of transmitting the first contract certificate to the first external CSP may include: making a certificate installation package comprising a contract certificate chain including the first contract certificate and eMAID information; and transmitting the certificate installation package to the first CSP.

The certificate installation package may include a certificate revocation list associated with the first contract certificate and access information to an Online Certificate Status Protocol (OCSP) server.

The method may further include: receiving a second contract certificate for a second EV from a second external CSP and forwarding the second contract certificate to a certificate provisioning service device (CPS) to enable the CPS to store the second contract certificate; and when a contract certificate installation request is received from the second EV in a roaming situation where the second EV stays in a service network of the charging service providing device, making the second contract certificate stored in the CPS to be transmitted to and installed in the second EV.

The second external CSP may be one of all external CSPs having respective roaming contracts with the charging service providing device.

The operation of making the second contract certificate to be transmitted to and installed in the second EV may include: notifying a completion of an installation to the second external CSP after the second contract certificate is installed in the second EV.

According to another aspect of the present disclosure, provided is a charging service providing device. The charging service providing device includes: a processor; and a memory storing at least one program instruction to be executed by the processor. The at least one program instruction, when executed by the processor, causes the processor to: generate a first contract certificate for a first electric vehicle (EV) and transmit the first contract certificate to a first external charging service providing device (CSP) so as to enable the first contract certificate to be installed in the first EV via the first external CSP; receive a second contract certificate for a second EV from a second external CSP and forward the second contract certificate to a certificate provisioning service device (CPS) to enable the CPS to store the second contract certificate; and when a contract certificate installation request is received from the second EV in a roaming situation where the second EV stays in a service network of the charging service providing device, make the second contract certificate stored in the CPS to be transmitted to and installed in the second EV.

The first external CSP may include all external CSPs having respective roaming contracts with the charging service providing device, and the second external CSP may be one of the all external CSPs having respective roaming contracts with the charging service providing device.

The first external CSP may include all external CSPs, and the second external CSP may be one of the all external CSPs.

The program instruction causing the processor to generate the first contract certificate for the first EV and transmit the first contract certificate to the first external CSP may include program instructions causing the processor to: send a request to release an installation standby to the first external CSP when a predetermined time elapsed after transmitting the first contract certificate to the first external CSP or when the first contract certificate is installed in the first EV.

The program instruction causing the processor to make the second contract certificate to be transmitted to and installed in the second EV may include program instructions causing the processor to: notify a completion of an installation to the second external CSP after the second contract certificate is installed in the second EV.

The program instruction causing the processor to transmit the first contract certificate to the first external CSP may include program instructions causing the processor to: make a certificate installation package comprising a contract certificate chain including the first contract certificate and eMAID information; and transmit the certificate installation package to the first CSP.

The certificate installation package may include a certificate revocation list associated with the first contract certificate and access information to an Online Certificate Status Protocol (OCSP) server.

According to yet another aspect of the present disclosure, a method is provided to authorize a charging of an electric vehicle (EV) for a PnC-based authorization in a roaming environment. The method comprises: generating a first contract certificate for a first electric vehicle (EV) to transmit the first contract certificate to a first external charging service providing device (CSP) so as to enable the first contract certificate to be installed in the first EV via the first external CSP; receiving a second contract certificate for a second EV from a second external CSP to forward the second contract certificate to a certificate provisioning service device (CPS) so as to enable the CPS to store the second contract certificate; and making the second contract certificate stored in the CPS to be transmitted to and installed in the second EV when a contract certificate installation request is received from the second EV in a roaming situation where the second EV stays in a service network of the charging service providing device, and authorizing a charging of the second EV based on a condition that the second contract certificate is installed in the second EV when the second EV makes an authorization request.

The second external CSP may be one of all external CSPs having respective roaming contracts with the charging service providing device.

The operation of making the second contract certificate to be transmitted to and installed in the second EV may include: notifying a completion of an installation to the second external CSP after the second contract certificate is installed in the second EV.

The operation of receiving the second contract certificate from the second external CSP to store the second contract certificate may include: receiving a certificate installation package comprising a contract certificate chain including the second contract certificate and eMAID information.

According to an exemplary embodiment of the present disclosure, a home CSP distributes the contract certificate for the EV to substantially all CSPs in preparation for a certificate installation request or a certificate update request from the EV, so that a visited CSP may immediately provide the contract certificate to the EV in response to the certificate installation request or the certificate update request even in a roaming environment to facilitate the installation or update of the contract certificate in the EV. Accordingly, the exemplary embodiment of the present disclosure enables to install or update the contract certificate in the EV in the roaming environment, which facilitates the PnC-based charging of the EV and enhances the conveniences of EV users.

On the other hand, since various certificates other than the contract certificate can be installed in the visited CSP, the visited CSO, and the charging station related thereto, a responsiveness of each entity may be improved and a flexibility may be given to the authorization process for the EV.

BRIEF DESCRIPTION OF THE DRAWINGS

In order that the disclosure may be well understood, there will now be described various forms thereof, given by way of example, reference being made to the accompanying drawings, in which.

Figure 1:
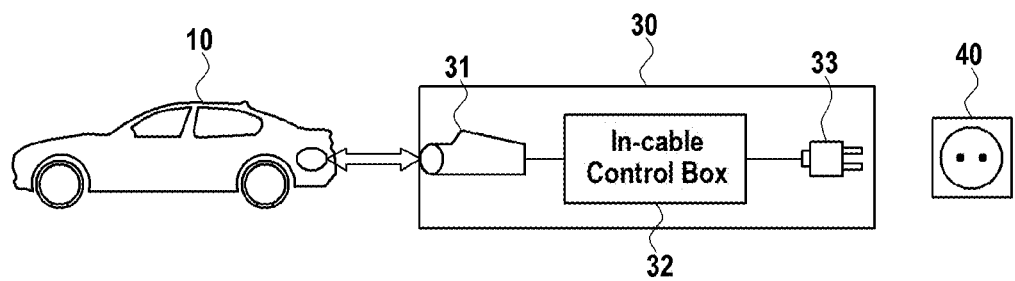
FIG. 1 is a conceptual diagram illustrating an EV conductive charging system to which an exemplary embodiment of the present disclosure may be applied.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. However, it should be understood that the present disclosure is not limited to particular embodiments and includes all modifications, equivalents, and alternatives falling within the idea and scope of the present disclosure. In describing each drawing, similar reference numerals have been used for similar components.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. The expression "and/or" may be used to refer to a combination of a plurality of listed items or any of the plurality of listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted as having ideal or excessively formal meanings unless explicitly defined in the present application.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads. The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Wireless power charging system (WCS)": A system for wireless power transfer and control of interactions including operations for an alignment and communications between a ground assembly (GA) and a vehicle assembly (VA).

"Wireless power transfer (WPT)": A transfer of electric power between a power source such as a utility and the power grid and the EV through a contactless channel.

"Utility": A set of systems which supply electrical energy and include a customer information system (CIS), an advanced metering infrastructure (AMI), rates and revenue system, etc. The utility may provide an EV with energy according to a rates table and through discrete events. Also, the utility may provide information related to certification on EVs, interval of power consumption measurements, and tariff.

"Smart charging": A system in which an electric vehicle supply equipment (EVSE) and/or a PEV communicate with the power grid to optimize a charging ratio or a discharging ratio of an EV by taking into account the capacity allowed by the power grid or the tariff for the electricity.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupling": A magnetic coupling between two coils. One of the two coils may be referred to as the ground assembly (GA) coil, and the other one of the two coils may be referred to as the vehicle assembly (VA) coil.

"Original Equipment Manufacturer (OEM)": A server operated by a producer who manufactures the EV and may refer to a Root Certification Authority (RootCA) issuing an OEM RootCA Certificate.

"Mobility Operator (MO)": A service provider with which the EV owner has a contract for services related to the EV operation such as a charging, authorization, and billing to enable an EV driver may charge the EV in the charging station.

"Charging station (CS)": A facility equipped with one or more electric vehicle supply equipment's (EVSEs) and physically performing the charging to the EVs.

"Charging station operator (CSO)": A party responsible for the provisioning and operation of a charging infrastructure and managing electricity to provide a requested energy transfer service. The charging station operator may be a term having a same concept as a charge point operator (CPO).

"Charge Service Provider (CSP)": An entity managing and authenticating EV user's credentials and providing the billing and other value-added services to customers. The CSP may be considered as a special type of the mobility operator (MO) and may be integrated with the MO.

"Clearing House (CH)": An entity handling cooperation between the MOs, CSPs, and CSOs. In particular, the clearing house may perform a role of an intermediate actor facilitating authorization, billing, and settling procedure for the EV charging service roaming, between two clearing parties.

"Roaming": Information changes and a scheme and provisions between CSPs, which allows EV users to access the charging services provided by multiple CSPs or CSOs pertaining to multiple e-mobility networks by using a single credential and contract.

"Credential": A physical or digital asset representing an identity of an EV or EV owner, and may include a password used to verify the identity, a public key and private key pair used in a public key encryption algorithm, a public key certificate issued by a certification authority, information related to a trusted root certification authority.

"Certificate": An electronic document binding a public key to an ID by a digital signature.

"Service session": A collection of services around a charge point related to the charging of an EV assigned to a specific customer in a specific timeframe with a unique identifier.

"e-Mobility Account Identifier (eMAID)": A unique identifier of an EV that links a Contract Certificate for the EV to a payment account of the EV owner.

Exemplary embodiments of the present disclosure will now be described in detail with reference to the accompanying drawings.

Figure 2:
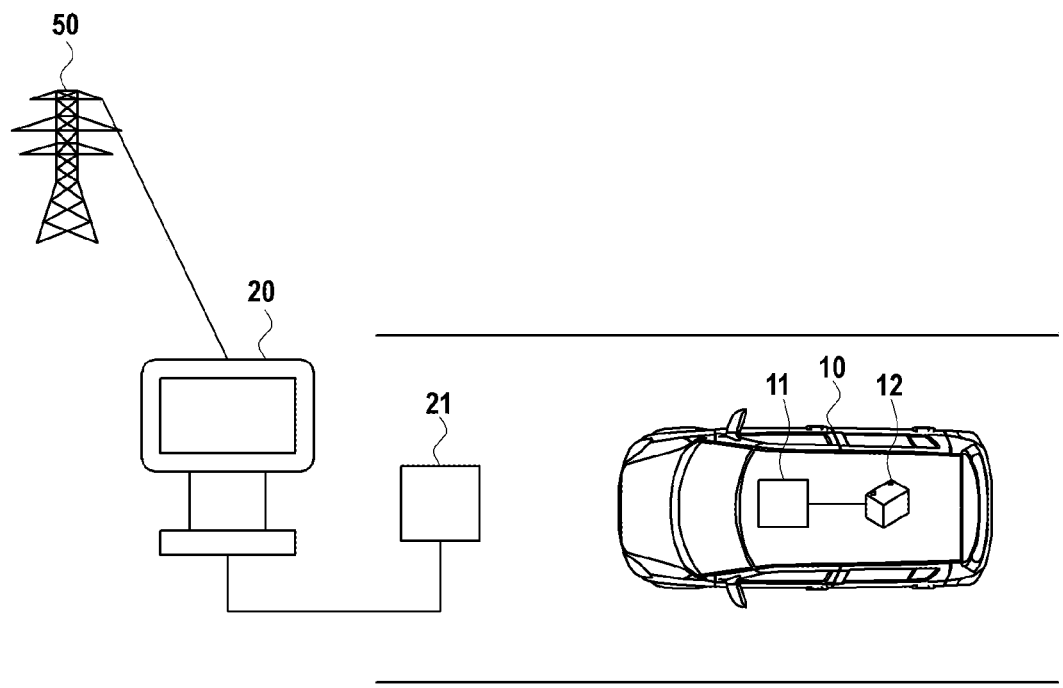
FIG. 2 is a conceptual diagram illustrating a wireless power transfer (WPT) system to which an exemplary embodiment of the present disclosure may be applied.

In an electric vehicle charging system for implementing the present disclosure, an electric vehicle (EV) may be connected to a charging station through a wired or wireless link to receive energy from the charging station and charge an energy storage device such as a battery with the supplied energy. FIGS. 1 and 2 show a method of charging an electric vehicle by a conductive charging and a wireless power transfer, respectively.

FIG. 1 is a conceptual diagram illustrating an electric vehicle conductive charging system to which an exemplary embodiment of the present disclosure may be applied. The electric vehicle conductive charging may be performed by connecting the electric vehicle (hereinafter referred to as 'EV') to a power supply circuit of a charging station by a charging cable 30, e.g. by connecting a cable connector of the charging station 20 to an inlet of the EV 10.

The EV 10 may be generally defined as an automobile driven by an electric motor that is powered by a rechargeable energy storage device such as a battery mounted on the EV 10. The EV 10 may be a hybrid electric vehicle (HEV) having the electric motor as well as an internal combustion engine. Also, the EV 10 is not limited to an automobile but may also be a motorcycle, a cart, a scooter, or an electric bicycle.

The EV 10 may include a plug inlet or a receptacle that may be coupled with a connector of a charging cable 30. The plug inlet provided in the EV 10 may support a slow charging or a rapid charging. Here, the EV 10 may include either a single inlet that supports both of the slow charging and the rapid charging through a single plug connection, or a plurality of inlets that respectively support the slow charging and the rapid charging.

The EV 10 may further include an on-board charger to support the slow charging or a charging that uses an alternating current (AC) power supplied from the power grid system. The on-board charger may boost a level of the AC power supplied from the power grid system and convert into a direct current (DC) power to supply the DC power to the battery of the EV 10 during the course of the slow charging. Contrarily, in case the DC power is supplied to the inlet of the EV 10 for the rapid charging, the DC power may be supplied to the battery without an intervention of the on-board charger.

The EV charging cable 30 may include at least one of a charging plug 31, an in-cable control box (ICCB) 32, and a wall jack plug 33. The charging plug 31 may be a connection part that can be electrically connected to the inlet of the EV 10. The ICCB 32 may communicate with the EV 10 to receive status information of the EV or to control the electric power charging of the EV 10. Although the ICCB 32 is illustrated as being included in the EV charging cable 30, the ICCB 32 may be installed in a place other than the EV charging cable 10, e.g., in a power supply circuit in the charging station or may be connected to the power supply circuit. The wall jack plug 33 may include an electrical connection member such as a general plug or a cord set and allows the charging cable 30 to be connected to a wall jack or an outlet of the charging stand to receive the power.

Meanwhile, a wall jack 40 may refer to a connection point between the charging stand of the charging station and the charging connector 31. However, the present disclosure is not limited thereto, and the wall jack 40 may refer to another kind of connection point between the charging device installed in another place and the charging connector 31. For example, the wall jack 40 may be installed at a commercial dedicated charging station facility as well as at various places such as a parking lot of the EV owner's house, a parking lot allocated for the EV charging at a gas station, or a parking area at a shopping center or an office building, for example.

FIG. 2 is a conceptual diagram illustrating a wireless power transfer (WPT) system to which an exemplary embodiment of the present disclosure may be applied.

The wireless power transfer (WPT) for an EV can be defined as a transfer of electrical energy from a supplier device to a consumer device through a magnetic field in a magnetic resonance condition without a current flow through a galvanic connection. The wireless power transfer may be used to charge the EV 10 by transmitting the electric power from the charging station 20 to the EV 10.

As shown in FIG. 2, the WPT may be performed by at least one component of the EV 10 and the charging station 20 and to transfer the electric power to the EV 10 without any conductive wire.

The EV 10 may include a power reception pad 11 having a reception coil suitable for receiving the magnetic energy from the charging station 20 wirelessly. The reception coil at the power reception pad 11 receives the magnetic energy from a transmission coil of a power transmission pad 21 at the charging station 20, for example, by the magnetic resonance. The magnetic energy received by the EV 10 is converted into an induced current, which is rectified into a DC current to charge the battery 12.

The charging station 20 may receive the electric power from the power grid 50 or the power backbone, and may supply the energy to the EV 10 through the transmission pad 21. The transmission pad 21 has the transmission coil, which may generate magnetic flux and supply the magnetic energy amplified by the magnetic resonance to the EV 10. The charging station 20 may be located in various places such as the parking lot of the EV owner's house, the parking lot allocated for the EV charging at a gas station, and the parking area at a shopping center or an office building, for example.

The charging station 20 may communicate with a power infrastructure management system or an infrastructure server that manages the power grid 50 through wired or wireless communications. Also, the charging station 20 may perform the wireless communications with the EV 10. Here, the wireless communications may include a wireless LAN (WLAN) based on Wi-Fi according to the IEEE 802.11 protocol or a P2PS communications using a low frequency (LF) magnetic field signal and/or a low power excitation (LPE) magnetic field signal. In addition, the wireless communications between the charging station 20 and the EV 10 may include one or more of various communication schemes such as Bluetooth, Zigbee, and cellular communications.

Meanwhile, according to ISO 15118 industrial standard which is a communication standard for the EV charging, the EV and the charging station may exchange messages to control the overall charging process. That is, communications for charging the EV may be performed between an EV communication controller (EVCC) and a supply equipment communication controller (SECC) through the wireless LAN.

During the communication process, the EV first authenticates the charging station to ensure that the charging station is a trustworthy, and establishes a secure channel with the charging station to protect the communications from an unauthorized access. These operations may be achieved according to a standardized Transport Layer Security (TLS) protocol defined in RFC 5246 produced by TLS working group, Internet Engineering Task force (IETF). A TLS session may be established by a TLS session establishment procedure after an establishment of an IP-based communication connection.

Figure 3:
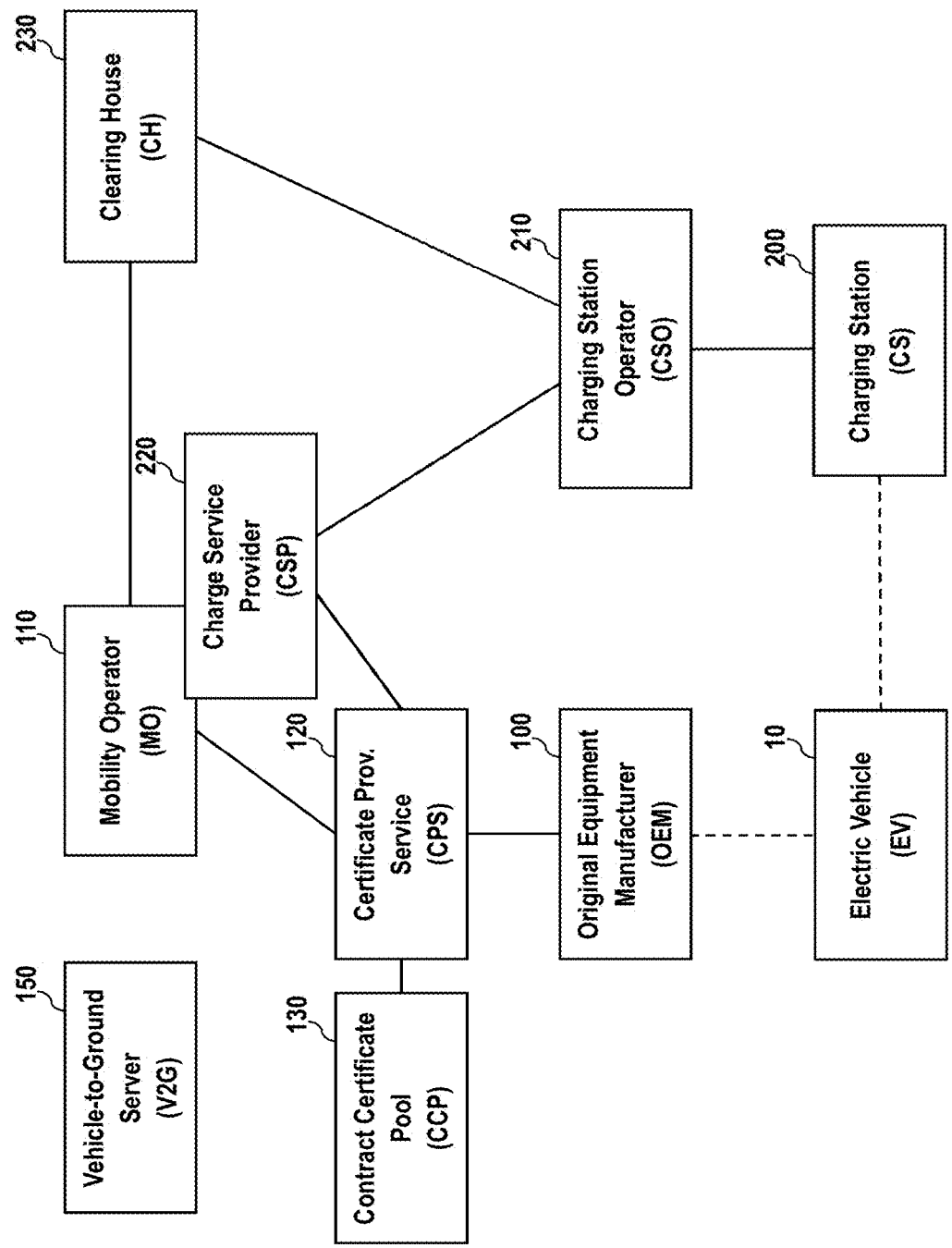
FIG. 3 is a block diagram of an EV charging infrastructure according to an exemplary embodiment of the present disclosure.

FIG. 3 is a block diagram of an EV charging infrastructure according to an exemplary embodiment of the present disclosure.

The EV charging infrastructure, which provides a charging service to the EV 10, includes an original equipment manufacturer (OEM) server 100, a mobility operator (MO) 110, and a certificate provisioning service (CPS) 120, a contract certificate pool (CCP) 130, a vehicle-to-ground (V2G) server 150, a charging station (CS) 200, a charging station operator (CSO) 210, a charge service provider (CSP) 220, and a clearing house (CH) 230.

The EV 100 refers to a general vehicle owned by an EV owner and can be charged by a conductive charging or a wireless power transfer at the charging station. The EV 100 is installed with an OEM Provisioning Certificate during a manufacturing process. After a purchase contract and a contract with the MO 110 operator are completed, a Contract Certificate may be installed in the EV 100. In addition, a vehicle-to-ground (V2G) RootCA certificate may be installed in the EV 100.

The original equipment manufacturer (OEM) server (100, hereinbelow referred to as 'OEM') is a Root Certification Authority (RootCA) that issues the OEM RootCA Certificate and operates subordinate certification authorities (SubCAs), i.e. an OEM SubCA 1 and an OEM SubCA 2. When an EV 10 is being manufactured, the OEM 100 issues an OEM provisioning certificate using an OEM Subordinate CA Certificate (i.e., OEM SubCA 2 certificate) to install in the EV 10.

The mobility operator (MO) 110 is a service provider with which the EV owner has a contract for services related to the EV operation such as the charging, authorization, and billing to enable the EV driver may charge the EV in the charging station. In order for the EV to receive the charging service from a charging station, the charging station has to belong to the MO or the charging infrastructure has to support a roaming scenario. The MO 110 may be operated by an electricity supplier or an electricity wholesaler. The MO 110 also acts as a RootCA that issues an MO RootCA certificate. An MO certificate chain consisting of the MO RootCA Certificate and MO SubCA Certificates issued by MO SubCAs may be used for issuing when the Contract Certificate. In addition, according to the present disclosure, the MO certificate chain is used also to authenticate the Contract Certificate installed in the EV 10 in a non-roaming environment or a roaming environment. The MO may also be referred to as an 'E-mobility service provider (EMSP)'.

The certificate provisioning service (CPS) 120 provides a client such as the EV with a Contract certificate chain and encryption keys used for transmitting or receiving the certificates during a process of installing or updating the Contract Certificate in the EV. The CPS 120 is equipped with a Leaf Provisioning Certificate and Provisioning SubCA Certificates such as a Prov SubCA 1 Certificate and Prov SubCA 2 Certificate. When the Contract Certificate is installed or updated in the EV 100, the CPS 130 provides the EV with a provisioning service of providing a public key of each MO, a Diffie-Hellman (DH) public key, and eMAID along with the contract certificate chain, so that the EV validate the Contract certificate chain and verify the integrity and authenticity of the Contract Certificate using such data.

The contract certificate pool (CCP) 130 temporarily stores a response message for the installation or update during the process of installing or updating the Contract Certificate in the EV. Taking into account that a time limit set for the installation or update in the ISO 15118 standard is very short and strict, the response message is stored in the CCP 140 in advance and maintained until the installation or update is completed. Since there may be a plurality of EVs for which the installation or update of the Contract Certificate is performed, the response message is maintained in a form of a directory after an index is assigned to each message.

The Vehicle-to-ground (V2G) server 150, hereinbelow referred to as 'V2G') acts as a RootCA in the public key infrastructure (PKI) for the EV charging infrastructure. Thus, the V2G 150 serves as a highest trust anchor, and all actors shown in FIG. 3 consider the V2G root CA as a trusted actor.

The charging station (CS) 200 actually performs charging for the EV 100. The charging station 200 may include at least one conductive charger and/or a wireless charging spot. One or more charging stations 200 may be installed in a dedicated commercial charging area. Also, the charging station 200 may be located at various places such as a parking lot of the EV owner's house, a parking let allocated for the EV charging at a gas station, and a parking area of a shopping center or an office building, for example. The charging station 200 may also be referred to as a 'charging point', 'EV charging station', 'electric charging point', 'electronic charging station (ECS)', or 'EV supply equipment (EVSE)'.

The charging station operator (CSO) 210 or the charge point operator (CPO) provides and operates the charging station and manages electricity to provide a requested energy transfer service. The CSO 210 may be operated by a charging station manufacturer or an electricity provider, for example. Regarding the PKI, the CSO 210 operates CPO SubCAs such as CPO SubCA 1 and CPO SubCA 2 required to issue a SECC Leaf Certificate for each charging station.

A charge service provider (CSP) 220 manages and authenticates credentials of the EV user and provides the billing and other value-added services to customers. The CSP 220 may be considered as a special type of the MO 110 and may be implemented with the MO 110. The may exist a plurality of CSPs 220. In such a case, each CSP 220 may be associated with one or more CSOs 210 so that the CSP 220 and the one or more CSOs 210 constitute a charging network. The EV 110 can receive the charging service by a plug-and-charge or park-and-charge (PnC) method in the CSO 210 associated with the CSP 220 that is associated again with the MO 100 in a contractual relationship with the EV 110. However, a roaming is required when the EV 110 is to be charged from another CSO 210 which is not associated with the CSP 220 that is associated again with the MO 100 in the contractual relationship with the EV 110. Each CSP 200 may exchange information with another CSP or CSO 210 belonging to another charging network and may also exchange information with the clearing house 230 to enable the roaming.

The clearing house (CH) 230 handles the cooperation between the MOs 110 and the CSPs 220. That is, the clearing house 230 may perform a role of an intermediate actor facilitating the authorization, billing, and settling procedure for the EV charging service roaming between two clearing parties. When the EV driver wishes to charge the EV at a charging station that does not belong to the charging network of the MO 110 having the contractual relationship with the EV, the CH 230 may be connected to the CSO 210 or the CSP 220 to facilitate the roaming. In a situation that the roaming is necessary, the CH 230 enables the CSO 210 or CSP 220 to contract with the MO 110 and turn over authorization data and charging detail records (CDR) to the MO 110. The CH 230 may also be referred to as a 'contract clearing house (CCH)', 'mobility clearing house (MCH)', 'roaming platform', or 'e-mobility clearing house (E-MOCH)'.

Though the 'charging service operator (CSO)', the 'certificate provisioning service (CPS)', the 'mobility operator (MO)', the 'clearing house (CCH)', and the 'V2G' seems to refer to a person or an organization, these terms used herein including the claims are just named functionally in short to increase a readability and may be implemented in hardware, software, and/or a combination thereof. In an exemplary embodiment, these components may be a server device implemented by a combination of hardware and software and allowing an access of other devices through a network such as Internet. Since these components are functionally divided, two or more of them may be stored and executed in a single physical device or may be integrated into a single program. In particular, a single entity may serve as both the CSO and the CSP, and another single entity may serve as both the CPS and the CCP. Meanwhile, one or more of the components may be rearranged to have a different appearance and name.

On the other hand, the EV charging service and the related infrastructure are in a field where various industrial fields such as automobiles, power grid, energy, transportation, communications, finance, and electronic products converges, and standardizations have been carried out in parallel in various viewpoints and by various subjects including multiple international standardization organizations and domestic standardization organizations in individual countries, and thus there exist many terms containing similar concepts. In particular, a charging station operator (CSO) and a charge point operator (CPO) have in common in roles and functions and may refer to substantially the same entity as each other although there may be some functional differences and nuances. In addition, the charging service provider (CSP) has at least partially in common with the mobility operator (MO) in terms of their roles and functions and may be used interchangeably. Such circumstances is to be taken into account while interpreting the present specification including the claims.

Figure 4:
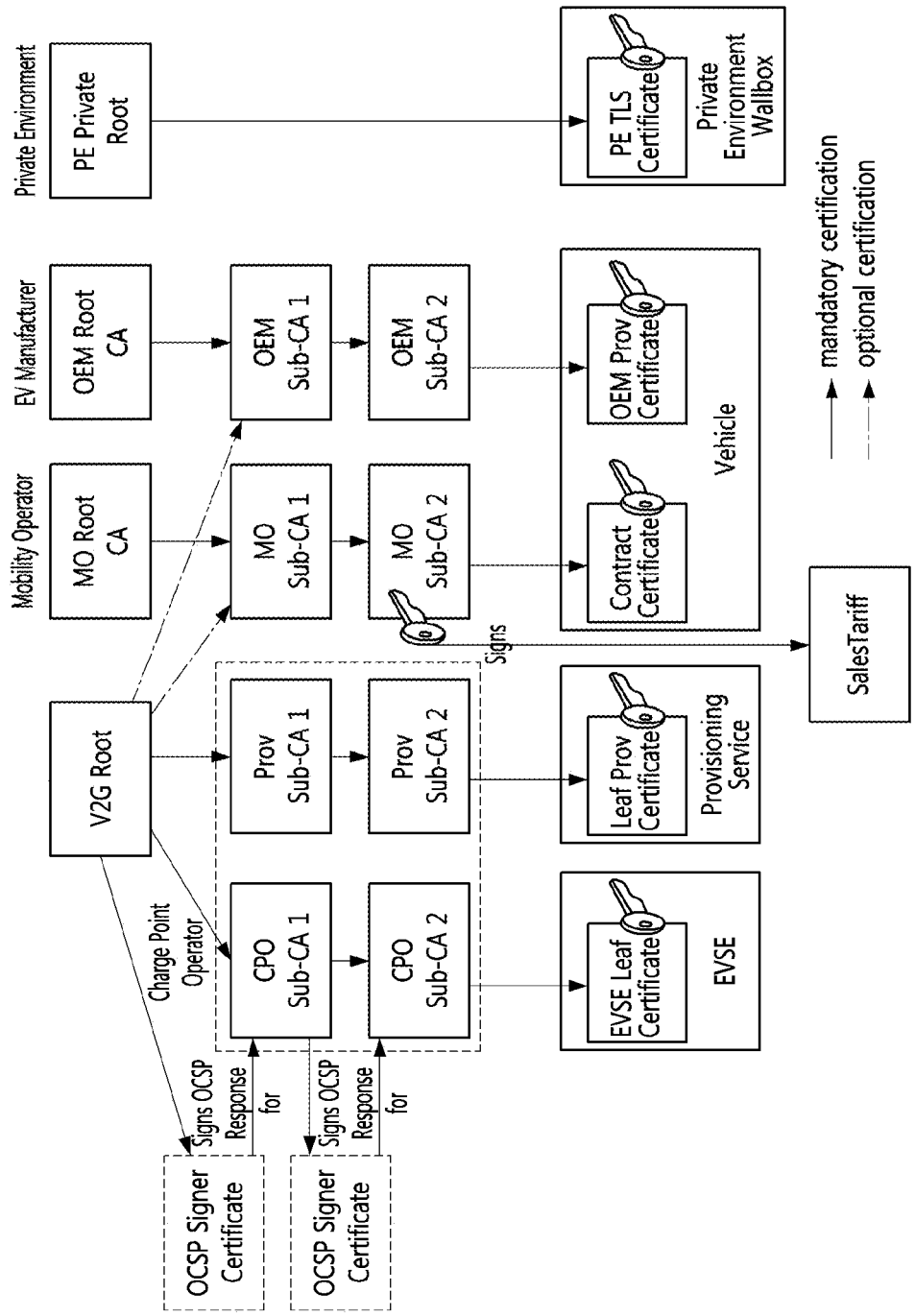
FIG. 4 shows an example of a PKI-based certificate hierarchy applicable to an exemplary embodiment of the present disclosure.

In the EV charging infrastructure shown in FIG. 3, a public key infrastructure (PKI) is used as a basis for operating the PnC. The PKI provides a framework for verifying identities of a person and a device, activating confidential communications, and ensuring controlled access to resources. FIG. 4 shows an example of a PKI-based certificate hierarchy applicable to an exemplary embodiment of the present disclosure. The certificate hierarchy shown in the drawing is prescribed in the ISO 15118 standard.

Referring to FIG. 4, the OEM 100 acts as the RootCA that issues the OEM RootCA Certificate, and also operates the SubCAs, i.e. the OEM SubCA 1 and the OEM SubCA 2. Accordingly, the OEM 100 issues the OEM RootCA Certificate as well as the OEM SubCA 1 Certificate and OEM SubCA 2 Certificate by signing with its own private key. When the EV is being manufactured, the OEM SubCA 2 issues the OEM Provisioning Certificate using a private key paired with a public key contained in the OEM SubCA 2 certificate and installs the OEM Provisioning Certificate in the EV 10. The OEM Provisioning Certificate can be used to verify a signature in the certificate installation request message during a certificate installation process for the EV 10, and enables to uniquely identify the vehicle during a life of the EV 10.

The MO 110 also acts as a RootCA that issues the MO RootCA certificate. The MO 110 may issue an MO SubCA 1 Certificate by adding its own signature to the ID and public key of the MO SubCA 1. The MO SubCA 1 may issue an MO SubCA 2 Certificate by adding its signature to the ID and public key of the MO SubCA 2. Based on a contract concluded between the MO 110 operator and the EV owner when the EV is delivered, the MO SubCA 2 issues the Contract Certificate by using a private key paired with the public key contained in the MO SubCA 2 Certificate and installs the Contract Certificate through a charging station (CS) 200 that the EV first visits. The Contract Certificate is linked to the EV owner's payment account via a unique identifier called an e-Mobility Account Identifier (eMAID).

As shown in the drawing, the OEM Provisioning Certificate and the Contract Certificate are issued based on the OEM RootCA Certificate and MO RootCA Certificate issued by the OEM 100 and the MO 110, respectively, and are independent from certificates issued based on the global RootCA certificate, i.e. V2G RootCA Certificate and used by other actors. As indicated by dashed lines in FIG. 3, however, the OEM Provisioning Certificate and the Contract Certificate may be issued by using the V2G RootCA certificate instead of the OEM RootCA Certificate and the MO RootCA Certificate.

The V2G 150 enables to issue at least two certificate chains, i.e. a certificate chain for the CS 200 and the CSO 210, which is a synonym for the CPO as mentioned above, and another certificate chain for the provisioning service.

First, the V2G 150 may issue a CPO SubCA 1 Certificate by adding its own signature to the ID and the public key of the CPO SubCA 1. The CPO SubCA 1 (or MO SubCA 1) may issue a CPO SubCA 2 Certificate by adding its signature to the ID and the public key of the CPO SubCA 2. The CPO SubCA 2 may issue an SECC Leaf Certificate using the private key paired with the public key contained in the CPO SubCA 2 Certificate and provide the SECC Leaf Certificate to the CS 200 so as to be installed in the CS 200. The SECC Leaf Certificate may be used by the EV 10 during an establishment of the TLS communications to verify that the EV 10 is communicating with an authentic charging station not a fake charging station. This certificate is stored in the CS 200 as well as in a backend of the CSO 210.

The V2G 150 may issue a Provisioning SubCA 1 Certificate by adding its signature to the ID and the public key of the Provisioning SubCA 1. The SubCA 1 may issue a Provisioning SubCA 2 Certificate by adding its signature to the ID and the public key of the Provisioning SubCA 2. The Provisioning SubCA 2 may issue a Leaf Provisioning Certificate by using a private key paired with the public key contained in the Provisioning SubCA 2 Certificate and provide the Leaf Provisioning Certificate to the CPS 120 so as to be installed in the CPS 120.

Meanwhile, each of the RootCAs, i.e. the V2G RootCA, the MO RootCA, and the OEM RootCA, may issue and provide an Online Certificate Status Protocol (OCSP) certificate, so that clients may access an OCSP server according to an Online Certificate Status Protocol to query a certificate status regarding a revocation of the certificate indicating a validity of the certificate and receive a query result. Although it is shown in the drawing as if the OCSP certificate is available only for the CPO SubCAs (i.e. CPO SubCA 1 and CPO SubCA 2) for simplicity, all the RootCAs may issue an OCSP certificate to allow the query of the validity of the certificates in the certificate chains associated with their RootCA certificates.

In exemplary embodiments of the present disclosure, the certificate is verified or validated by one of three generally available methods. First, the certificate recipient may decrypts the message signature in the certificate with the public key in the certificate to restore a hash, and compares the restored hash with a hash included in the certificate to validate the integrity of the certificate. Second, the certificate recipient may validate the integrity and reliability of each certificate in the certificate chain by comparing owner information of each certificate with issuer information of its SubCA certificate sequentially from the RootCA certificate to the leaf certificate in the certificate chain. Third, the certificate recipient may validate the certificate by checking whether the certificate has been revoked or not through a Certificate Revocation List (CRL) received from the RootCA or by querying the certificate status from the OCSP server associated with the RootCA.

Figure 5:
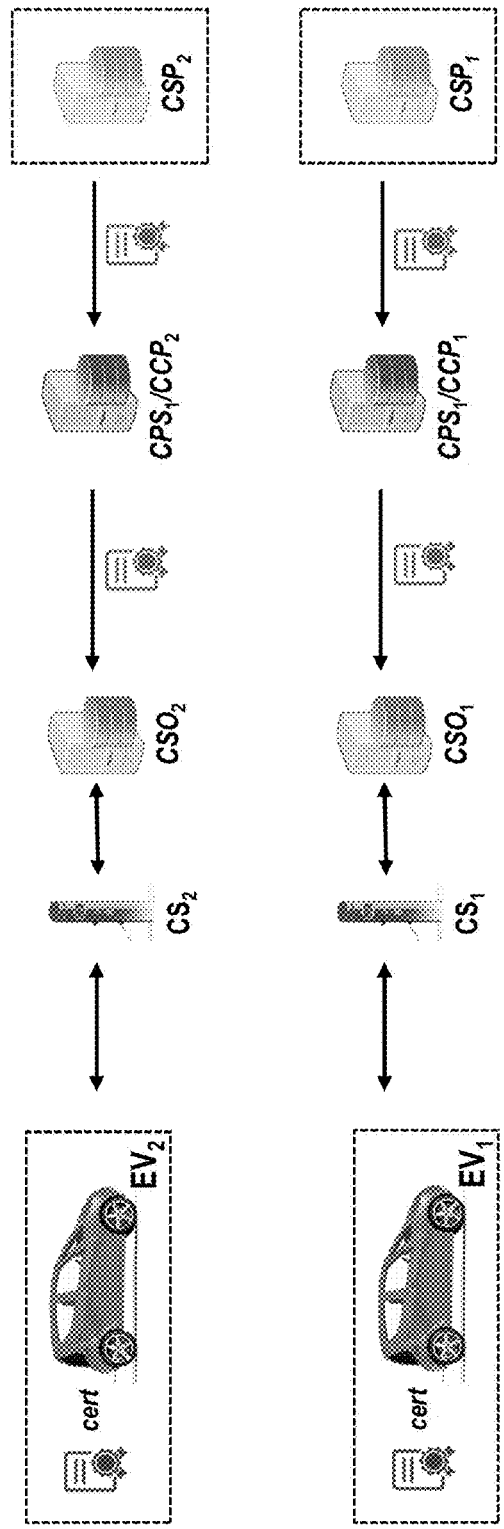
FIG. 5 exemplarily shows nodes constituting the PnC charging infrastructure enabling the roaming service for the EV.

FIG. 5 exemplarily shows nodes constituting the PnC charging infrastructure enabling the roaming service for the EV. In the example shown in the drawing, a first EV (EV1) is in a contractual relationship with a first CSP (CSP1), and may use the charging service at an EV Supply Equipment (EVSE) of a first CS (CS1) connected to the first CSO (CSO1) belonging to a network of the first CSP (CSP1). Also, a second EV (EV2) is in a contractual relationship with a second CSP (CSP2), and may use the charging service at the EVSE of a second CS (CS2) connected to the second CSO (CSO2) belonging to a network of the first CSP (CSP2). Thus, the first EV (EV1) and the second EV (EV2) may be charged without any difficulty in the CSs connected to respective home CSOs, i.e., CSO1 and CSO2. However, in case that the first EV (EV1) visits the second CS (CS2) managed by the second CSO (CSO2) or the second EV (EV2) visits the first CS (CS1) managed by the first CSO (CSO1), a roaming circumstance is generated, where the certificate may need to be installed or updated in the EV.

Figure 6:
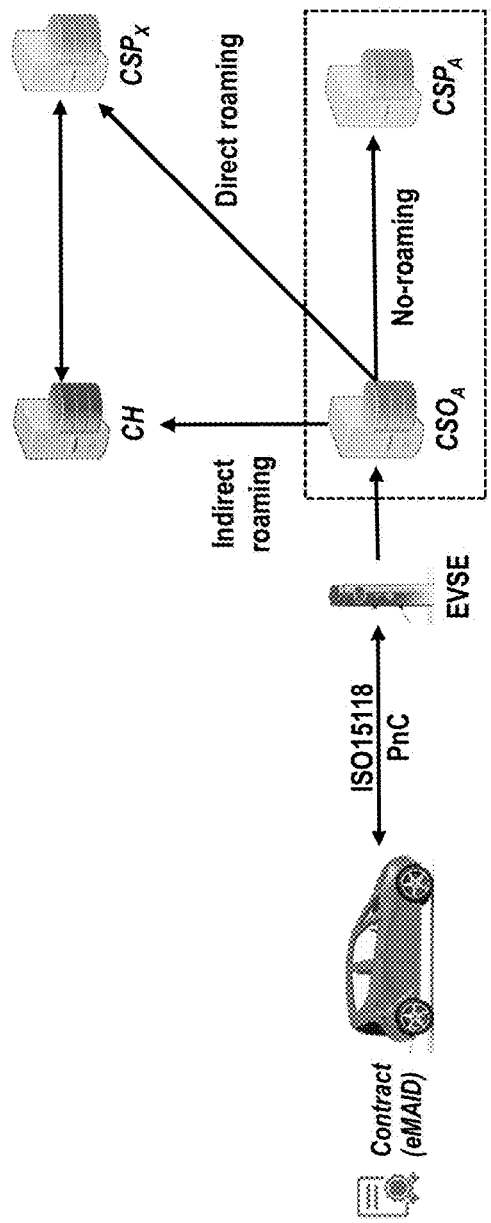
FIG. 6 illustrates examples of a case where the roaming is not required and a case where the roaming is required.

FIG. 6 illustrates examples of a case where the roaming is not required and a case where the roaming is required.

In a PnC authentication infrastructure, the EV is automatically authenticated, charged, and paid by simply connecting the EV to the CS or the EVSE. For an application of the PnC authentication, the EV owner must conclude a service use contract with the MO or CSP. After a conclusion of the contract, the Contract Certificate is installed in the EV, and the authentication, the authorization, and the payment are accomplished based on the Contract Certificate. Accordingly, once the EV owner visits the CS managed by the CSO belonging to the network of the MO or CSP having a contractual relationship with the EV and plugs the EV plug into the CS or parks the EV on the wireless charging spot, the EV automatically presents the Contract Certificate to the CS and gets the authentication and the charging service.

In the EV charging infrastructure, there may exist a plurality of MOs or CSPs, and each MO or CSP establishes an independent network in terms of an enablement of the PnC. While each EV can freely use the PnC service in the network belonging to the MO or CSP with which the EV owner has the contractual relationship, the PnC service for the EV may be limited or unavailable in the other networks. For example, in case that the EV is in the contractual relationship with the first CSP (CSPA) in FIG. 5, the EV can use the PnC charging service in the network to which the first CSP (CSPA) belongs, e.g., at the EVSE managed by the CSOA associated with the first CSP (CSPA).

Contrarily, in case that the EV is in the contractual relationship with the second CSP (CSPX), the EV may not use the PnC charging service properly in the network to which the first CSP (CSPA) belongs, e.g., at the EVSE managed by the CSOA associated with the first CSP (CSPA). If, however, there exists a roaming contract between a visited CSP (e.g., CSPA) and a home CSP (e.g., CSPX), the visited CSO (CSOA), upon receiving an authorization request from the EV, may access the home CSP (CSPA) to enable the PnC charging service to the EV. Meanwhile, if there exists an indirect roaming contract through a clearing house between the visited CSP (e.g., CSPA) and the home CSP (e.g., CSPX), the visited CSO (CSOA), upon receiving then authorization request from the EV, may enable the PnC charging service to the EV with a support of the clearing house.

A general authorization process will now be described in detail with reference to FIGS. 7-11.

Figure 7:
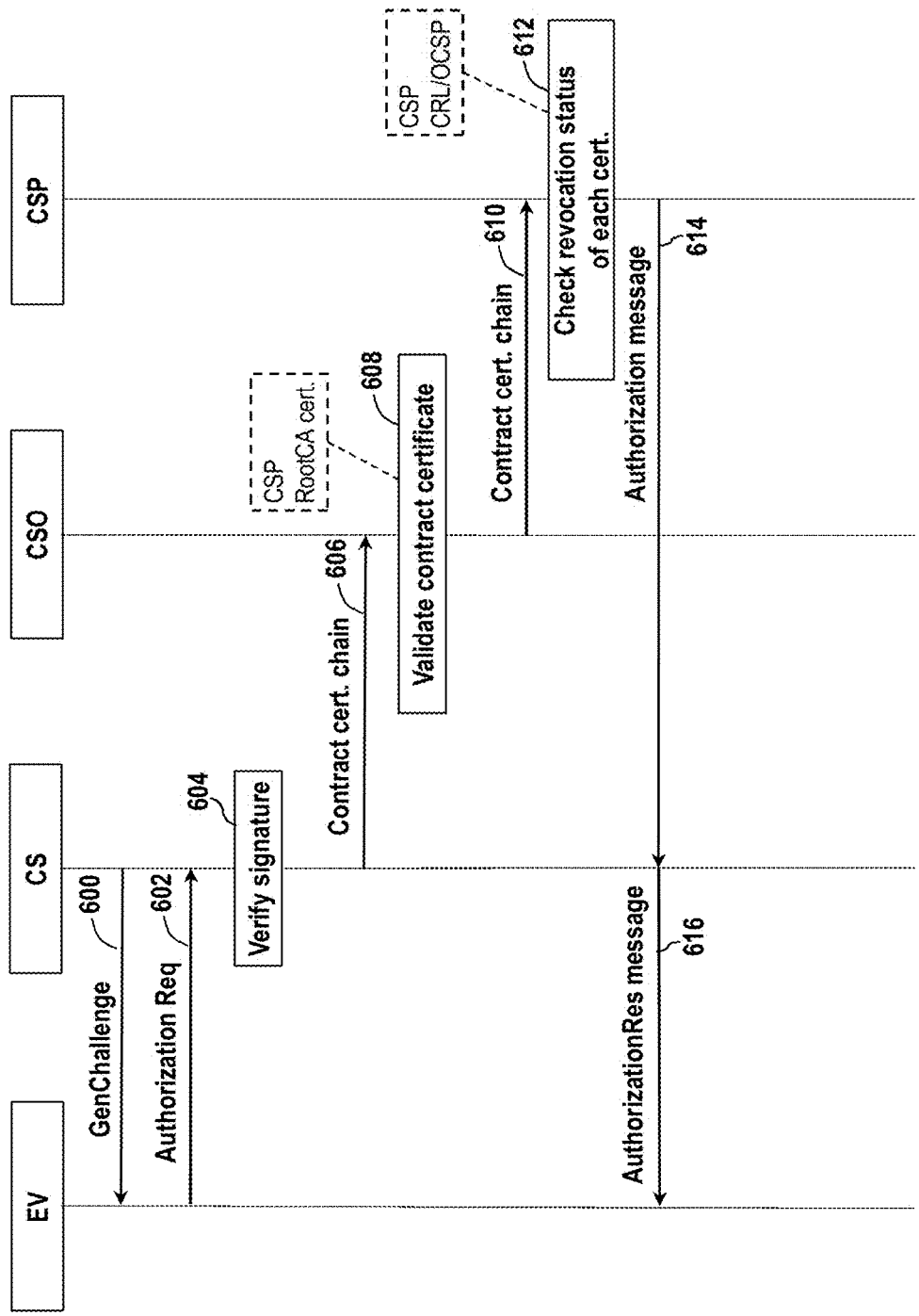
FIG. 7 is a sequence diagram illustrating a general service authorization process according to a contract in a situation where the roaming is not required.

FIG. 7 is a sequence diagram illustrating a general service authorization process according to a contract in a situation where the roaming is not required.

In the example shown in the drawing, the SECC of the CS may generate a challenge (GenChallenge) by encrypting a random number with its private key and send the challenge to the EVCC of the EV (operation 600). The CS maintains the challenge at least until receiving a subsequent message from the EV. Upon receiving the challenge, the EV may decrypt the challenge with a public key of the CS, encrypt an authorization request message (AuthorizationReq) including a number chosen according to a prescribed rule with its private key, and send an encrypted authorization request message to the CS as a response to the challenge (operation 602). The authorization request message may include a contract certificate chain of the EV.

The CS decrypts a signature included in the authorization request message (AuthorizationReq) with a public key of the EV to restore the hash, and compares the restored hash with the hash included in the authorization request message to verify the signature in the authorization request message (operation 604). At this time, the CS may additionally determine whether a response value included in the authorization request message corresponds to the challenge.

Subsequently, the CS forwards the contract certificate chain received from the EV to the CSO (operation 606). The CSO validates the contract certificate chain (operation 608). As described above, the validation of the integrity and reliability of the contract certificate chain can be accomplished by sequentially comparing the owner information of each certificate with issuer information of its SubCA certificate from the RootCA certificate to the leaf certificate in the certificate chain.

Next, the CSO may forward the contract certificate chain to the CSP (operation 610). For each certificate in the contract certificate chain, the CSP may check whether the certificate is revoked or not by using the certificate revocation list (CRL) or by querying the OCSP server (operation 612). Depending on a check result, the CSP may transmit an authorization message authorizing a contract, i.e., a transaction, to the CS (operation 614). Upon receiving the authorization message, the CS sends an authorization result message (AuthorizationRes) to the EV (operation 616).

Since, however, the MO RootCA Certificate which is the highest certificate in the contract certificate chain is not installed in the EV (according to an ISO 15118-20 standard version effective as of Jul. 2, 2018), the contract certificate chain sent to the CS by the EV in the operation 602 does not include the MO RootCA Certificate while including the Contract Certificate itself, which is a leaf certificate, and the MO SubCA 1 Certificate and MO SubCA 2 Certificate. As a result, the CSO receiving the certificate chain from the CS has to validate the contract certificate chain without the MO RootCA Certificate in the operation 608, and the validation may be incomplete unless the CSO has acquired the MO RootCA Certificate in addition to the CSP RootCA Certificate. Of course, the CSP RootCA Certificate maintained by the CSO cannot replace the MO RootCA Certificate. In addition, since an access of the CSP to the CRL or OCSP server associated to the MO RootCA other than the CRL or the OCSP server associated with the CSP RootCA is not sure, the checking of whether the certificate is revoked or not in the operation 612 may also be incomplete.

Figure 8:
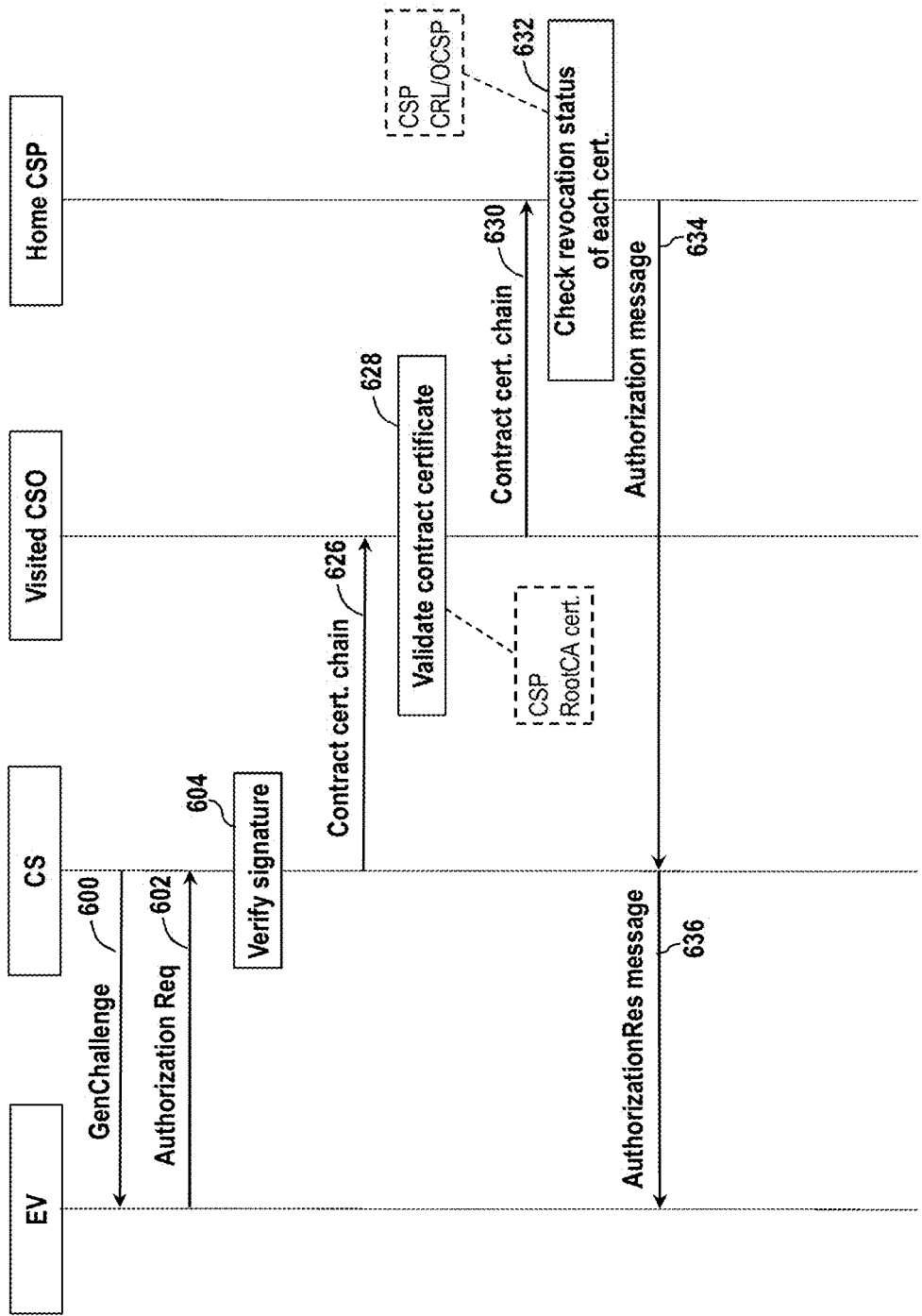
FIG. 8 is a sequence diagram illustrating a general service authorization process according to a contract in a situation where a direct roaming occurs.

FIG. 8 is a sequence diagram illustrating a general service authorization process according to a contract in a situation where a direct roaming occurs. In the example shown in the drawing, it is assumed that the visited CSO managing the CS does not belong to the network of the home CSP having the contractual relationship with the EV, but a roaming contract relationship has been established between the visited CSP and the home CSP.

In this case, the operations 600-604 may be performed in the same manner as the process shown in FIG. 7. That is, the CS may send the challenge to the EV (operation 600), and the CS may send the authorization request message (AuthorizationReq) to the CS in response to the challenge (operation 602). Then, the CS may verify the signature in the authorization request message (operation 604).

Subsequently, the CS forwards the contract certificate chain received from the EV to the visited CSO (operation 626). The visited CSO validates the contract certificate chain (operation 628). At this time, the visited CSO can identify a path to access the home CSP with reference to the eMAID. Accordingly, the visited CSO may check the home CSP and forward the contract certificate chain to the home CSP (operation 630). For each certificate in the contract certificate chain, the home CSP may check whether the certificate is revoked or not by using the certificate revocation list (CRL) or by querying the OCSP server (operation 632). Depending on the check result, the home CSP may transmit the authorization message authorizing the contract, i.e., the transaction, to the CS (operation 634). Upon receiving the authorization message, the CS sends the authorization result message to the EV (operation 636).

In this case also, the visited CSO has to validate the contract certificate chain without the MO RootCA Certificate in the operation 628, and the validation may be incomplete unless the CSO has acquired the MO RootCA Certificate in addition to the CSP RootCA Certificate. Besides, since it is not sure that the home CSP can access the CRL or OCSP server associated to the MO RootCA other than the CRL or the OCSP server associated with the CSP RootCA, the checking of whether the certificate is revoked or not in the operation 632 may also be incomplete.

Figure 9:
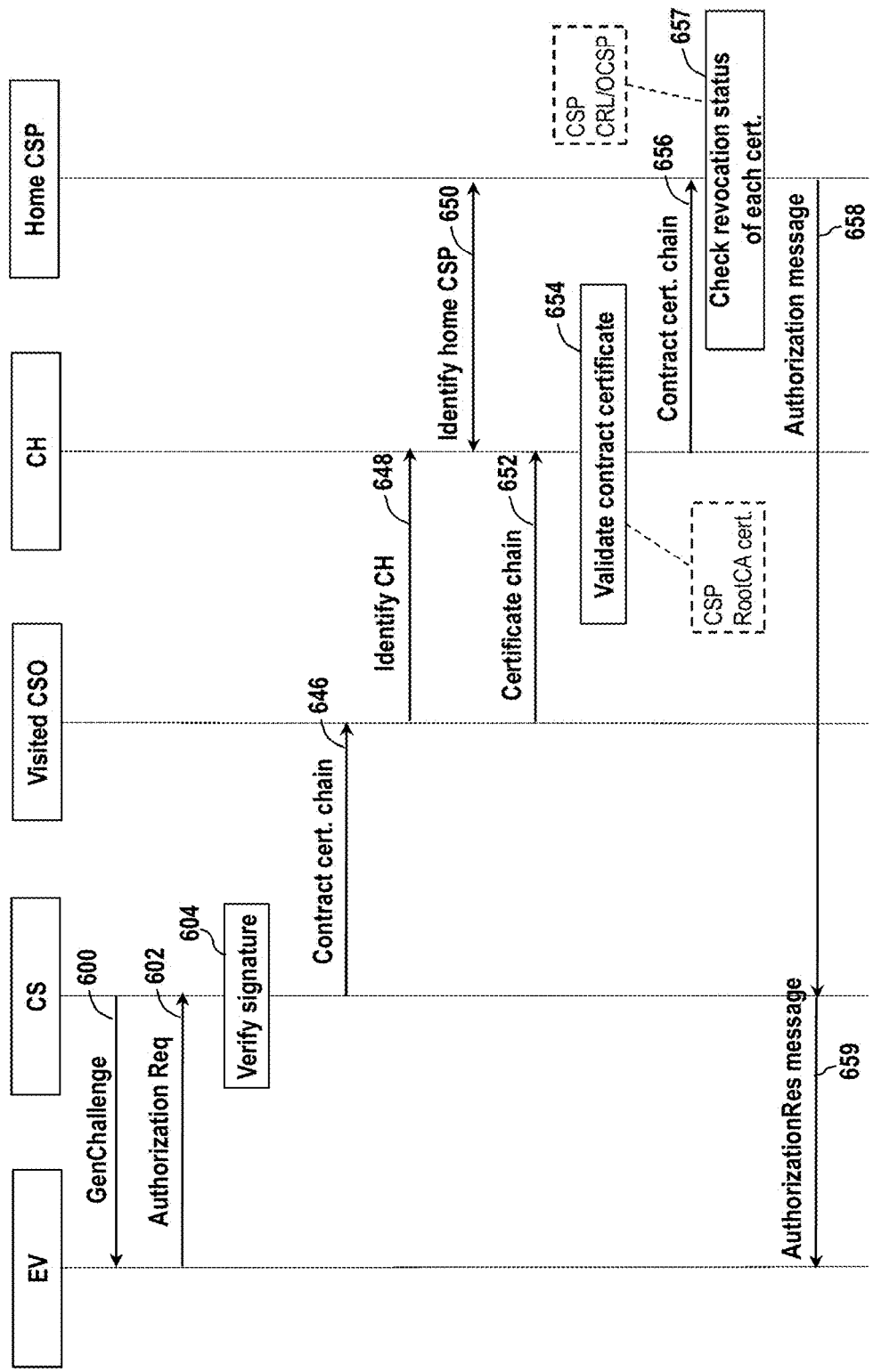
FIG. 9 is a sequence diagram illustrating a general service authorization process according to a contract in a situation where an indirect roaming occurs.

FIG. 9 is a sequence diagram illustrating a general service authorization process according to a contract in a situation where an indirect roaming occurs. In the example shown in the drawing, it is assumed that the visited CSO managing the CS does not belong to the network of the home CSP having the contractual relationship with the EV, but an indirect roaming contract relationship involving the clearing house has been established between the visited CSP and the home CSP.

In this case, the operations 600-604 may be performed in the same manner as the processes shown in FIGS. 7 and 8. That is, the CS may send the challenge to the EV (operation 600), and the CS may send the authorization request message (AuthorizationReq) to the CS in response to the challenge (operation 602). Then, the CS may verify the signature of the authorization request message (operation 604). Next, the CS forwards the contract certificate chain received from the EV to the visited CSO (operation 646).

Since the visited CSO has no contractual relationship with the home CSP having concluded a contract with the EV, the visited CSO cannot identify the home CSP with information such as the eMAID that the visited CSO possesses. However, since the visited CSO has a contractual relationship with the clearing house, the visited CSO can check whether the clearing house can identify the home CSP and which clearing house can identify the home CSP (operation 648). After checking that the clearing house can identify at least one home CSP (operation 650), the visited CSO may forward the contract certificate chain to the clearing house (operation 652). The clearing house may validate the contract certificate chain (operation 654), and then forward the contract certificate chain to the home CSP (operation 656). For each certificate in the contract certificate chain, the home CSP may check whether the certificate is revoked or not by using the certificate revocation list (CRL) or by querying the OCSP server (operation 657). Depending on the check result, the home CSP may transmit the authorization message authorizing the contract, i.e., the transaction, to the CS (operation 658). Upon receiving the authorization message, the CS sends the authorization result message to the EV (operation 659).

In this case also, the validation may be incomplete in the operation 654 unless the clearing house has acquired the MO RootCA Certificate in addition to the CSP RootCA Certificate. Besides, since it is not sure that the home CSP can access the CRL or OCSP server associated to the MO RootCA other than the CRL or the OCSP server associated with the CSP RootCA, the checking of whether the certificate is revoked or not in the operation 657 may also be incomplete.

Figure 10:
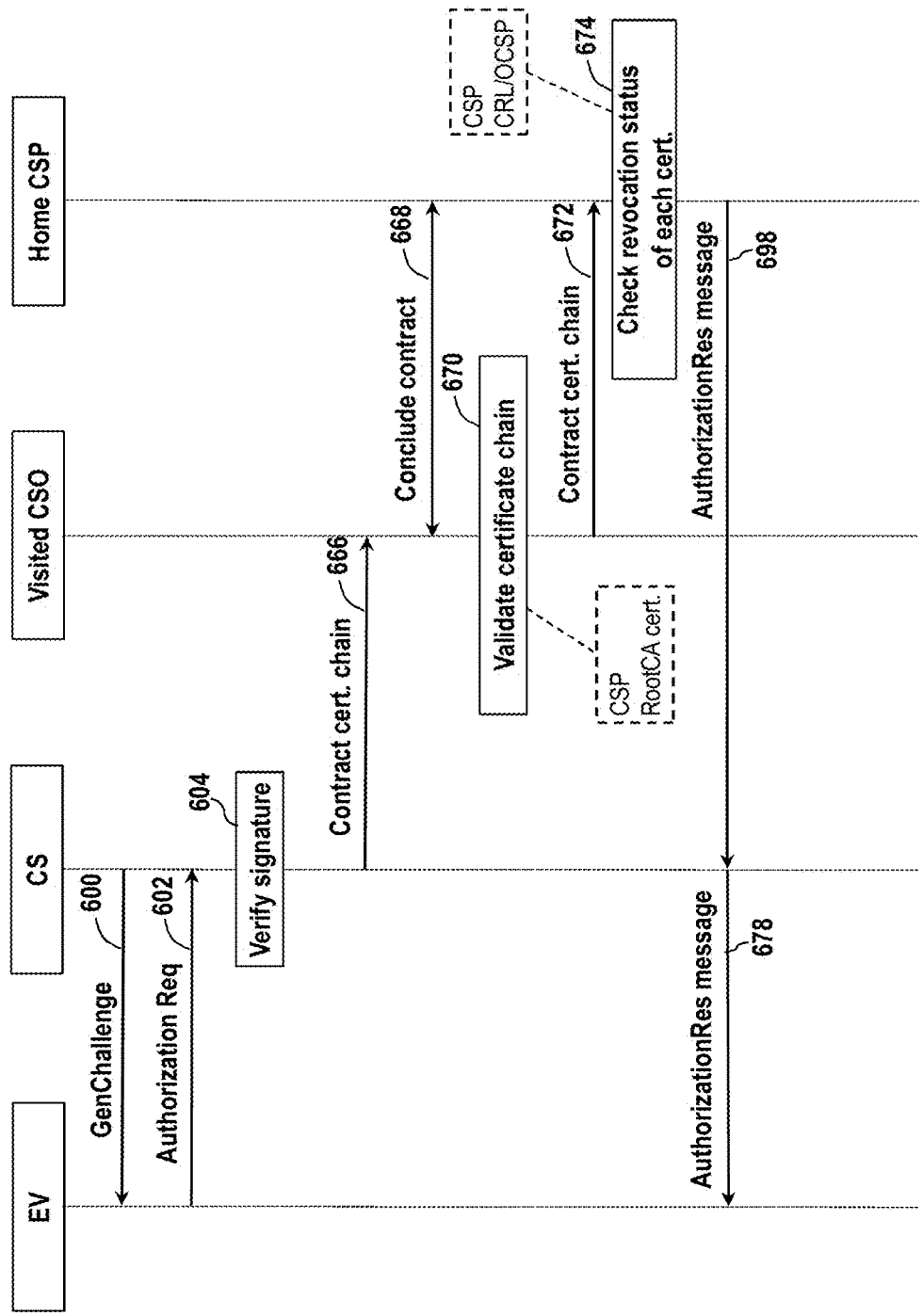
FIG. 10 is a sequence diagram illustrating a general service authorization process according to a contract in a situation where an on-the-fly direct roaming occurs.

FIG. 10 is a sequence diagram illustrating a general service authorization process according to a contract in a situation where an on-the-fly direct roaming occurs. In the example shown in the drawing, it is assumed that the visited CSO managing the CS does not belong to the network of the home CSP having the contractual relationship with the EV, but the visited CSO can make an on-the-fly direct roaming contract with the home CSP.

In this case, the operations 600-604 may be performed in the same manner as the processes shown in FIGS. 7 and 8. That is, the CS may send the challenge to the EV (operation 600), and the CS may send the authorization request message (AuthorizationReq) to the CS in response to the challenge (operation 602). Then, the CS may verify the signature of the authorization request message (operation 604). Next, the CS forwards the contract certificate chain received from the EV to the visited CSO (operation 646).

Subsequently, the visited CSO may make an on-the-fly roaming contract with the home CSP (operation 668). Then, the visited CSO may validate the contract certificate chain (operation 670). The visited CSO may know the path to access the home CSP with reference to the eMAID. Accordingly, the visited CSO may forward the contract certificate chain to the home CSP (operation 672). For each certificate in the contract certificate chain, the home CSP may check whether the certificate is revoked or not by using the certificate revocation list (CRL) or by querying the OCSP server (operation 674). Depending on the check result, the home CSP may transmit the authorization message authorizing the contract, i.e., the transaction, to the CS (operation 676). Upon receiving the authorization message, the CS sends the authorization result message to the EV (operation 678).

In this case also, the validation may be incomplete in the operation 670 unless the visited CSO has acquired the MO RootCA Certificate in addition to the CSP RootCA Certificate. Besides, since it is not sure that the home CSP can access the CRL or OCSP server associated to the MO RootCA other than the CRL or the OCSP server associated with the CSP RootCA, the checking of whether the certificate is revoked or not in the operation 674 may also be incomplete.

Figure 11:
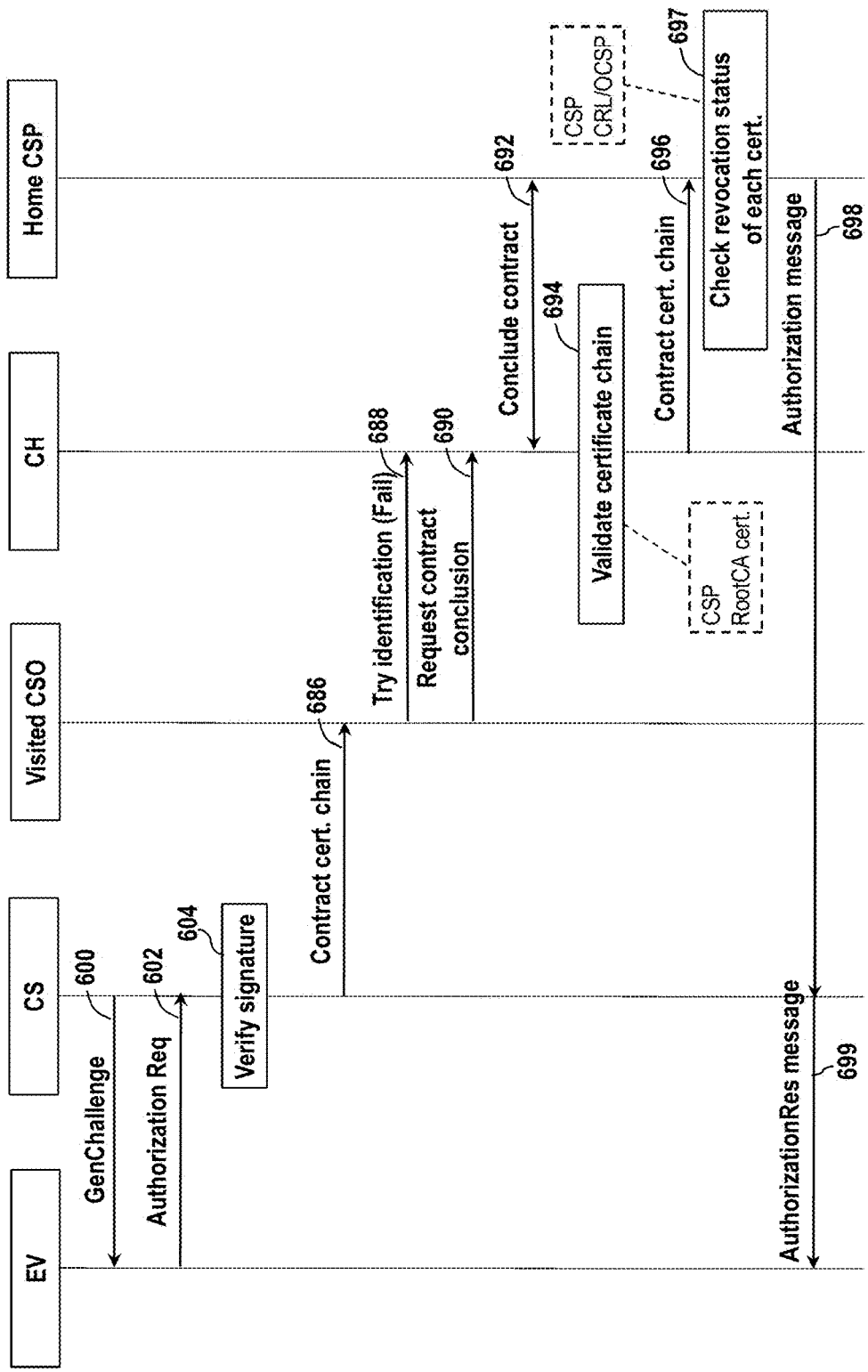
FIG. 11 is a sequence diagram illustrating a general service authorization process according to a contract in a situation where an on-the-fly indirect roaming occurs.

FIG. 11 is a sequence diagram illustrating a general service authorization process according to a contract in a situation where an on-the-fly indirect roaming occurs. In the example shown in the drawing, the visited CSO managing the CS does not belong to the network of the home CSP having the contractual relationship with the EV, and there exists no indirect roaming contract relationship involving the clearing house between the visited CSP and the home CSP. As a result, the visited CSO knows neither the home CSP nor the clearing house having a contractual relationship with the home CSP. However, it is assumed that the visited CSO may request the clearing house to make a contract on-line with the home CSP.

In this case, the operations 600-604 may be performed in the same manner as the processes shown in FIGS. 7 and 9. That is, the CS may send the challenge to the EV (operation 600), and the CS may send the authorization request message (AuthorizationReq) to the CS in response to the challenge (operation 602). Then, the CS may verify the signature of the authorization request message (operation 604). Next, the CS forwards the contract certificate chain received from the EV to the visited CSO (operation 686).

Since the visited CSO does not have any direct contractual relationship with the home CSP having concluded a contract with the EV, the visited CSO cannot identify the home CSP with information such as the eMAID that the visited CSO possesses. Moreover, the visited CSO may attempt to identify the clearing house already having a contractual relationship with the home CSP but fails (operation 688). In such a case, the visited CSO may request the clearing house to find the home CSP and make a contract with the home CSP (operation 690). Here, the contract may be for the purpose of a one-time EV charging and a payment settlement for the charging. After a contract is established between the clearing house and the home CSP (operation 692), the clearing house may validate the contract certificate chain (operation 694), and then forward the contract certificate chain to the home CSP (operation 696). For each certificate in the contract certificate chain, the home CSP may check whether the certificate is revoked or not by using the certificate revocation list (CRL) or by querying the OCSP server (operation 697). Depending on the check result, the home CSP may transmit the authorization message authorizing the contract, i.e., the transaction, to the CS (operation 698). Upon receiving the authorization message, the CS sends the authorization result message to the EV (operation 699).

In this case also, the validation may be incomplete in the operation 694 unless the clearing house has acquired the MO RootCA Certificate in addition to the CSP RootCA Certificate. Besides, since it is not sure that the home CSP can access the CRL or OCSP server associated to the MO RootCA other than the CRL or the OCSP server associated with the CSP RootCA, the checking of whether the certificate is revoked or not in the operation 697 may also be incomplete.

Meanwhile, as mentioned above, the CSP may issue the Contract Certificate for the EV as an MO SubCA according to the ISO 15118 standard. That is, when the EV sends the OEM Provisioning Certificate having been stored therein before the delivery of the vehicle to the CSO, the CSO creates the Contract Certificate and provides it to the EV. The Contract Certificate is stored in the EV and is presented to the CS whenever the EV receives the PnC service to enable the CS or another secondary actor to identify the EV's contract.

However, there may happen a situation that the EV visits the CS and requests the PnC service in a state where the Contract Certificate is not installed in the EV. For example, though the EV must send the OEM Provisioning Certificate having been installed in the EV before the vehicle delivery to the CSP or MO at the time of a first charging and be given the Contract Certificate, the CS which the EV visited for the first charging may be associated with a CSO not belonging to the network of the home CSP. In such a case, a situation arises in which the Contract Certificate must be installed in the EV under a roaming condition. Similar situations may occur also just after a change of an ownership of the EV or an EV memory failure. Meanwhile, the certificate to be installed in the EV in the roaming condition is not limited to the Contract Certificate and may be another certificate. There is no description regarding this issue in the ISO 15118 standard specifying a network layer and an application layer of V2G communication interfaces or in the IEC 63119-1 standard specifying information exchanges for EV charging roaming services.

According to an exemplary embodiment of the present disclosure, any CSP having contractual relationship with an EV may enable the EV to install or update the Contract Certificate or another certificate or data in any roaming situation. Hereinbelow, a method of installing or updating the certificate in the EV according to an exemplary embodiment of the present disclosure will be described in detail.

Figure 12:
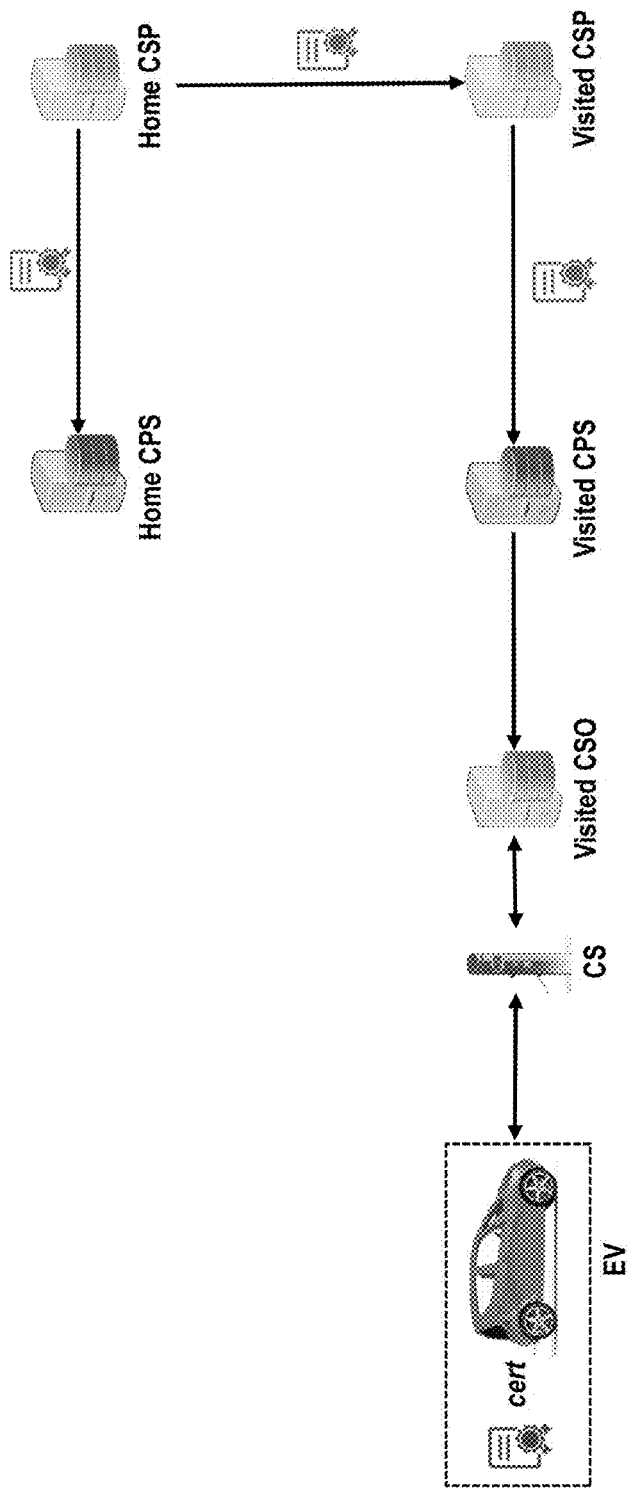
FIG. 12 illustrates a delivery path of the Contract Certificate from the home CSP to the EV through the direct roaming according to an exemplary embodiment of the present disclosure.

FIG. 12 illustrates a delivery path of the Contract Certificate from the home CSP to the EV through the direct roaming according to an exemplary embodiment of the present disclosure.

In the present embodiment, it is assumed that the Contract Certificate stored in the home CPS (CPSH) needs to be installed in the EV or an existing certificate in the EV needs to be updated with this certificate. The EV has visited and currently stays at a CS connected to a visited CSO (CSOV) belonging to a network of a visited CSP (CSPV). However, if the home CSP (CSPH) and the visited CSP (CSPV) are in a roaming contractual relationship, the EV may directly install the Contract Certificate stored in the home CPS (CPSH) by the roaming or update the existing certificate with the Contract Certificate stored in the home CPS (CPSH).

Figure 13:
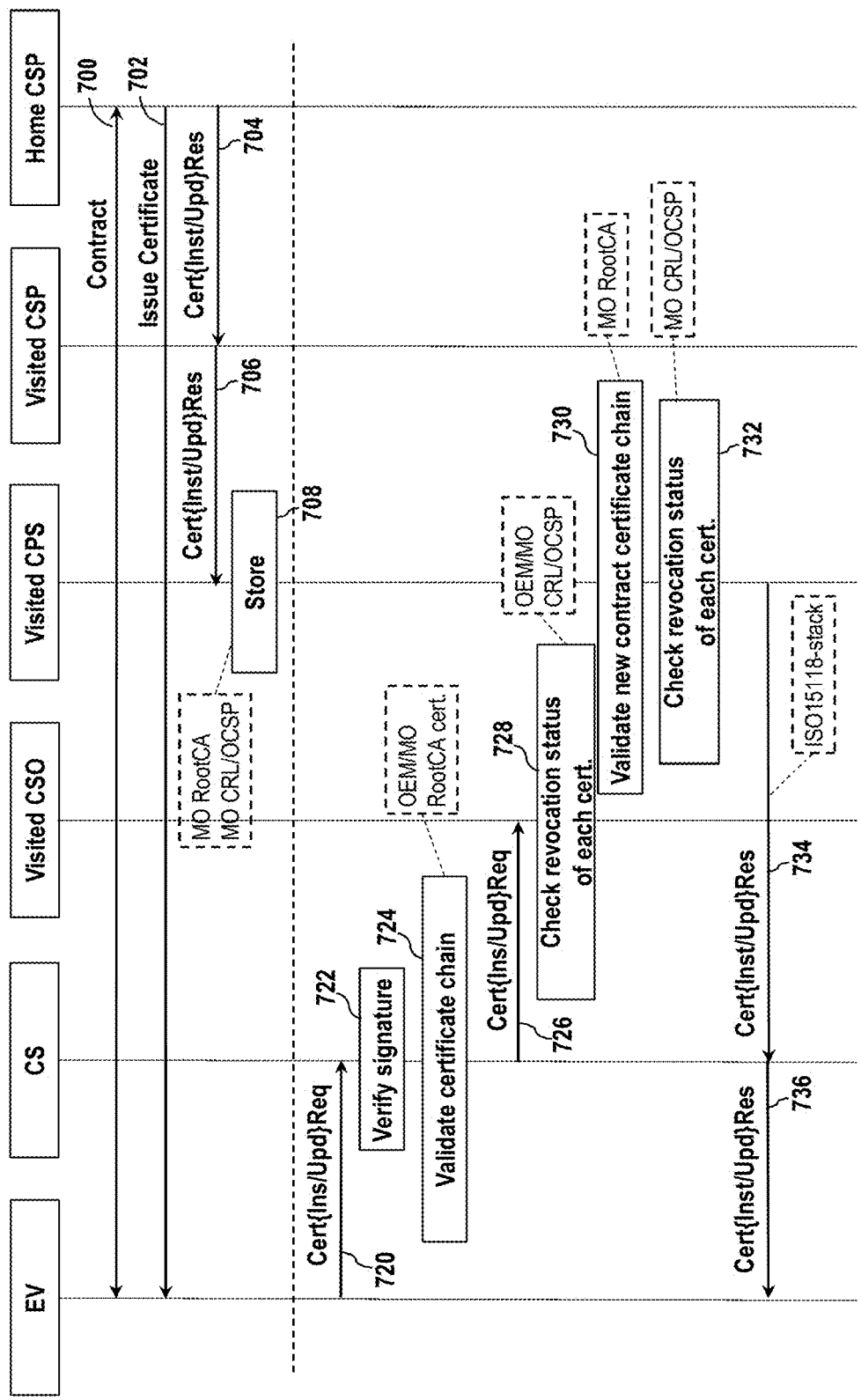
FIG. 13 is a sequence diagram illustrating the certificate delivery process shown in FIG. 12 in more detail.

FIG. 13 is a sequence diagram illustrating the certificate delivery process shown in FIG. 12 in more detail.

First, the EV owner and the home CSP operator may conclude a charging service contract (operation 700). After the conclusion of the contract, the home CSP may create the Contract Certificate for the EV (operate 702). The created certificate includes a public key of the EV, a hash of the public key, and a message signature obtained by encrypting the hash with a private key of the MO SubCA (i.e., MO SubCA 1 or MO SubCA 2). The certificate may be distributed to all visited CSPs having roaming contracts with the home CSP (operations 704-708).

In an exemplary embodiment, the operations 700-708 may be performed in advance before the EV transmits a certificate installation request message (CertificateInstallationReq) or a certificate update request message (CertificateUpdateReq) to the visited CSO through the CS. That is, in order to support the EV requesting the installation or the update of the certificate from the visited CSP, the home CSP may distribute a certificate installation package in advance to all visited CSPs having the contractual relationships, so that the visited CSPs can store the certificate installation package in the CPS and support the installation or update of the certificate of the EV in response to a request of the EV. At this time, the certificate installation package may be distributed in advance to all CSPs regardless of the contractual relationship in consideration of a possibility of the on-the-fly roaming. The certificate installation package may include the contract certificate chain and the eMAID account information, and may further include the certificate revocation list (CRL) and access information to the OCSP server. The transfer of the certificate installation package between the CSPs may be performed directly or through the clearing house as described below.

More specifically, after the home CSP creates the Contract Certificate in the operation 704, a certificate installation response message (CertificateInstallationRes) or a certificate update response message (CertificateUpdateRes) including the certificate installation package is distributed to all visited CSPs having contractual relationships with the home CSP over secure channels. At this time, each home CSP may validate the contract certificate chain, check the revocation status of the contract certificate chain, check the status of the eMAID account, and check if the contract can be authorized for the service. If the verifications show that there is no problem with the contract certificate chain, the eMAID account, and the contract, the home CSP may distribute the certificate package to all visited CSPs having the direct roaming contracts with the home CSP, to the clearing house having a certificate distribution contract with home CSP, or to both of them. For this distribution process, the home CSP may maintain a list of the visited CSPs, if any, having the direct roaming contracts with the home CSP. In addition, the home CSP may maintain a list of the clearing houses, if any, having the roaming contracts for the certificate installation with the home CSP. Communications for distributing the certificate package may happen over roaming endpoints. On the other hand, upon receiving the certificate installation package, the visited CSPs may distribute the package to their CPSs through the same procedure as is performed when the visited CSP issues the certificates for their own user.

Afterwards, when the EV requests to install or update the certificate, the visited CSO may retrieve the certificate installation package from the visited CPS and forward the certificate installation package to the EV. The installation or update process may have no difference between the non-roaming situation and the roaming situations. Operations 720 through 734 in FIG. 13 show this process.

Specifically, in operation 720, the EV may transmit the certificate installation or update request message (Cert{Ins/Upd}Req) to the CS. In case of the certificate installation request message, the EV may send the OEM provisioning certificate chain to the CS through communications conforming to the ISO 15118 standard. Meanwhile, the certificate update request message may include the contract certificate chain. Upon receiving the certificate installation or update request message (Cert{Ins/Upd}Req), the CS may verify the signature in the request message (operation 722). The CS may verify the signature by decrypting the signature included in the request message with the public key to restore the hash and comparing the restored hash with the hash included in the request message.

Subsequently, the CS validates the received certificate chain (operation 724). In case of the OEM Provisioning Certificate for the certificate installation, the certificate chain may be validated by comparing owner information of each certificate with issuer information of its SubCA certificate sequentially from the OEM RootCA Certificate to the OEM Provisioning Certificate which is the leaf certificate in the provisioning certificate chain to verify the integrity and reliability of each certificate in the provisioning certificate chain. In the case of the Contract Certificate for the certificate update, the certificate chain may be validated by comparing owner information of each certificate with issuer information of its SubCA certificate sequentially from the MO RootCA Certificate to the Contract Certificate which is the leaf certificate in the contract certificate chain to verify the integrity and reliability of each certificate in the contract certificate chain. Then, the CS transfers the certificate installation or update request message (Cert{Ins/Upd}Req) to the visited CSO (operation 726).

The visited CSO may check the revocation status of each certificate in the OEM provisioning certificate chain or the contract certificate chain (operation 728). The revocation status or the validity of the certificate may be checked by using the certificate revocation list (CRL) received from the OEM RootCA or the certificate revocation list received from the MO RootCA or by querying the certificate status from the OCSP server associated with the MO RootCA.

Next, the visited CPS validates the new contract certificate chain stored in the operation 708 based on the MO RootCA Certificate (operation 730). Also, the visited CPS checks the revocation status of each certificate in the new contract certificate chain (operation 732). The revocation status or the validity of the certificate may be checked by using the certificate revocation list (CRL) received from the MO RootCA or by querying the certificate status from the OCSP server associated with the MO RootCA.

Generally, when an ISO 15118-compliant EV attempts a TLS connection with the CS, the CS needs to prove that all the certificates in the CS's certificate chain are valid, i.e., not revoked. To do that, according to an exemplary embodiment of the present disclosure, the CS may request a CS management system (CSMS), periodically and frequently enough to keep the OCSP response valid, to retrieve OCSP responses from the OCSP responders of the CSO PKI. The CS may store a single OCSP response for each certificate chain.

For each certificate, the CS may determine to update the OCSP response just before the existing OCSP response expires, and may request the CSMS to retrieve the OCSP. The OCSP retrieval request may include an OCSP request message, a distinguished name (DN) of the issuer of the certificate, and a serial number of the certificate. For each request, the CSMS looks up its certificate database by the issuer DN and the serial number to retrieve the OCSP response URL. If no URL is found, the CSMS may try to retrieve the URL by another method. If no URL is available at its best, the CSMS may indicate an error in its response. Upon successful retrieval of the OCSP response, the CSMS may send back a list of OCSP response messages to the CS. If any of the retrievals failed, the CSMS may indicate which OCSP query has failed and the reason. The CS may store the received OCSP responses and send them to the EV during a TLS connection through an OCSP stapling. For each error, the CS may determine whether to retry the retrieval or enter a maintenance status depending on a type of the error.

The CSMS may maintain a certificate database for storing the certificates used by the CS or by itself in order to keep the information on the certificate status of CS up to date. Meanwhile, the CS may always maintain a set of valid OCSP responses for its certificate chain. It is desirable that the CS requests the OCSP responses from the CSMS frequently enough to keep the OCSP responses valid all the time.

After the new contract certificate chain is validated in the operation 730 and if there is no problem with the validity of each certificate in the new contract certificate chain in the operation 732, the visited CPS sends a certificate installation/update response (i.e., Cert{Ins/Upd}Res) message to the CS (operation 734). The CS may send the new contract certificate package to the EV, so that the EV may install or update the new certificate (step 736).

The Contract Certificate distributed to substantially all CSPs in the operations 704 to 708 may be deleted from the storage of each CSP to reduce the burden of storing private information when a certain time elapsed after the distribution or when the installation of the Contract Certificate is completed in the EV. To this end, it is preferable that the home CSP notifies the completion of the installation of the Contract Certificate to all the CSPs having received the distributed contract certificate and the clearing house after the installation of the Contract Certificate in the EV is completed.

First, the EV owner and the home CSP operator may conclude a charging service contract (operation 700). After the conclusion of the contract, the home CSP may create the Contract Certificate for the EV (operate 702). The created certificate includes a public key of the EV, a hash of the public key, and a message signature obtained by encrypting the hash with a private key of the MO SubCA (i.e., MO SubCA 1 or MO SubCA 2). The certificate may be distributed to all visited CSPs having roaming contracts with the home CSP (operations 704-708).

Though the CS sends, in the operation 736, the data received from the visited CPS in the operation 734, e.g., the contract certificate package, to the EV as described above, all certificate data received by the CS is not necessarily transmitted to the EV. That is, the CS may receive the certificate on its own needs to install the certificate or update a previously installed certificate. For example, the CS may retrieve, from the CSMS, some RootCA certificates and related metadata to be used to authenticate the EV and the CSMS as well as cross-certificates to be used to authenticate itself to the EV. In other words, the CS may have to store therein some RootCA certificates issued for the RootCA but not necessarily self-signed along with metadata for a secure operation. The metadata of a certificate may include the SHA1 hash (for TLS) as well as the DN of the issuer and the serial number of the certificate (for installing the certificate).

Examples of the certificates that the CS receives and stores or updates on its own needs are as follows. The CS needs the RootCA certificate of the CSMS's certificate chain (i.e., the RootCA certificate of the CSMS) to authenticate the CSMS while establishing a secure channel with the CSMS. Generally, this RootCA certificate is the same as the V2G RootCA Certificate of the CS. Also, when an ISO 15118-compliant EV chooses to get authorized by the PnC mechanism, and the validation of the contract certificate chain is the role of the CS, the CS may need to have the RootCA Certificate of the EMSP. In the case of the installation or update of the Contract Certificate, if the validation of the OEM provisioning certificate chain to be installed or the contract certificate chain to be updated is the role of the CS, the CS may need the OEM RootCA Certificate or the EMSP RootCA Certificate.

Furthermore, when the CSO supports a cross certification to allow services to the EVs that trust only a V2G RootCA other than the V2G RootCA of the CSO, the CS may need a cross-certificate issued by the V2G RootCA trusted by the EV. On the other hand, to check if the EV can trust the CSO's V2G RootCA (for TLS) Certificate or the CPS's V2G RootCA Certificate, the CS needs to know the metadata of the available trust anchors. The trust anchors include the CS's V2G RootCAs (including new RootCA for migration) and cross-certifying V2G RootCAs. On the other hand, the CS may need the RootCA certificates of the manufacturers of components of the CS, which is used to verify the integrity of the firmware binaries. In addition, for the migration of the V2G RootCA of the CS, if the CSO chooses to use the migration method as defined in RFC 4210, the CS may need to hold one of two cross-certificates during the migration period.

There may exist an OldWithNew certificate and a NewWithOld certificate. The OldWithNew certificate refers to a cross-certificate signed by the new RootCA for an old RootCA. The CS having an old certificate chain needs the cross-certificate of this type for the EVs that trust the new RootCA. The NewWithOld certificate refers to a cross-certificate signed by an old RootCA for a new RootCA. The CS having a new certificate chain needs the cross-certificate of this type for the EVs that trust the old RootCA.

According to an exemplary embodiment, the process that the CS receives the certificate to store or update on its own needs is triggered by the CSMS. That is, when the CSMS has an update on the CA certificates or the metadata that needs to be installed in the CS, the CSMS sends a list of updates to one or more CSs. Each update data may have a format of 'update=(type, certificate, metadata)'. For example, in case of the V2G RootCA of the CSO, each update data may be in the format of (V2G RootCA, <V2G RootCA Certificate>,-). In case of the EMSP RootCA Certificate, the update data may have the format of (EMSP RootCA, <EMSP RootCA Certificate>, -). In case of the OEM RootCA Certificate, the update data may have the format of (OEM RootCA, <OEM RootCA Certificate>, -). In case of cross-certificates, the update data may have the format of (CrossCertificate, <Cross Certificate>, -). In case of cross-certifying the V2G RootCA Certificate, the update data may have the format of (CrossRootCA, -, <metadata>). In case of the OldWithNew cross-certificate for migration, the update data may have the format of (OldWithNew, <OldWithNew certificate>, -). In case of the NewWithOld cross-certificate for migration, the update data may have the format of (NewWithOld, <NewWithOld certificate>, -).

In the case of the above certificates, upon receiving the update from the CSMS, the CS installs the received certificate or the metadata without an undue delay and updates an update time stamp.

According to another exemplary embodiment, the process that the CS receives the certificate to store or update on its own needs is triggered by the CS. That is, when the CS determines to update any changes of the CA certificates, e.g., periodically, the CS may request the CSMS for updates of the CA certificates by transmitting certain information to the CSMS. Examples of the information transmitted from the CS to the CSMS may include a timestamp of a last successful update and a list of DNs of the issuers and the serial numbers of the CA certificates currently stored in the CS. Upon receiving the update request, the CSMS may send the CA certificates or the metadata that have been updated or added after the indicated timestamp. Upon receiving the response from the CSMS, the CS securely stores the CA certificate or the metadata.

When the CSMS makes an update on the CA certificate database, the CSMS has to request relevant CSs to install the update or a collection of updates since the last update. Upon receiving the request, the CS installs the received update on the CA certificate and sets the timestamp to the time of the update. Depending on a policy of the CSO, the CS may periodically request an update on the CA certificates to the CSMS by providing the timestamp of the last update. When requested, the CSMS sends all the updates of the CA certificates that have changed since the timestamp in the request. When the CSMS sends an update on the CA certificate update, the CSMS sends a list of the certificate types, certificates, and metadata. At this time, only the metadata is sent to cross-certify the V2G RootCA certificate.

On the other hand, the CS may need to hold multiple CA certificates and relevant information for a secure operation. For example, when an ISO 15118-compliant EV chooses to get authorized by the PnC method, the CS may need the RootCA Certificates of the EMSPs to validate the contract certificate chain. For the installation of the Contract Certificate, the CS may also need the RootCA certificate of the OEMs or the EMSPs. When establishing the secure channel with the CSMS, the CS needs the RootCA certificate of the CSMS, which is typically the V2G RootCA Certificate. In addition, for a better interoperability between different V2G operators, the CS needs to maintain cross certificates issued by other V2G operators. Further, the CS needs to keep the metadata (e.g., the hash, the DN, and the serial number) of each trust anchor in order to determine if the EV can securely connect to the CSO.

According to an exemplary embodiment, the process that the CS updates the multiple CA certificates and relevant information for the secure operation may be triggered by the CS. When the CS determines to update any changes in its inventory of CA certificates, the CS may request the CSMS for the updates of all CA certificates. The request may include a timestamp of a last successful update request and a list of the DNs of the issuers and the serial numbers of the CA certificates in the CS. Upon receiving the request, the CSMS may check the timestamps of the CA certificate updates and send data of only updated certificates since the timestamp in the request to the CS. The certificates to send may include: the V2G RootCA Certificate of the CSMS and relevant metadata, the V2G RootCA Certificate of the CS and relevant metadata, the RootCA Certificate of contracted EMSPs, if needed, the OEM RootCA Certificates, if needed, the cross certificates issued to the V2G RootCA of the CS and relevant metadata, the metadata of the V2G RootCA Certificate associated with the cross certificates, and the root-migration cross certificates. Upon receiving a response from the CSMS, the CS may securely store the received CA certificates.

According to another exemplary embodiment, the process that the CS updates the multiple CA certificates and relevant information for the secure operation may be triggered by the CSMS. When the CSMS has an update on one of the CA certificates to be installed in the CS, the CSMS may request an update of the CA certificate to all or some of the CSs by sending a type of the certificate to be updated and a list of certificate data of the specified type. Examples of the type of the certificate may include the V2G RootCA Certificate of the CSMS (for the root-migration), the V2G RootCA Certificate of the CS (for the root-migration), the EMSP RootCA Certificate, the OEM RootCA Certificate, the cross certificates issued to the V2G RootCA of the CS, the V2G RootCA Certificate associated with the cross certificates, and the root-migration cross certificates. Upon receiving the request from the CSMS, the CS installs the received certificate data without an undue delay and updates the update-timestamp.

During the certificate update process described above, the CSMS may maintain a database of CA certificate data, including the certificate, the DN, the serial number, and the hash, tagged with the update time. The EV and the CS can communicate according to the ISO 15118 standard with the PnC identification method. Meanwhile, the CPS and the CCP may validate the certificate chain (i.e., the OEM provisioning certificate chain for the installation and the contract certificate chain for the update) and check the revocation status of each certificate in the OEM provisioning certificate chain for the installation and the contract certificate chain for the update.

After receiving the certificate for the update, the CS verifies the signatures of the CertificateInstallationReq and CertificateUpdateReq messages. Then, the CS sends the CSMS the data of: the CertificateInstallationReq or CertificateUpdateReq message (as it is), the PCID (for the installation) or the eMAID (for the update), an ISO 15118 schema version of the message, a deadline for the retrieval (due to an ISO 15118 timeout), a list of V2G RootCA Certificates trusted by the EV. Upon receiving the data, the CSMS may request the Contract Certificate from secondary actors and forward the received information back to the CS. In case that multiple Contract Certificates are received, the CSMS preferably indicates the completion of the reception to the CS. When no Contract Certificate is received, the CSMS may indicate an error message (e.g., 'NO_CONTRACT_CERTIFICATE_FOUND') to the CS. In case that the ISO 15118-2 standard is used, the CS may deliver the CertificateInstallationRes or CertificateUpdateRes message received from the CSMS to the EV with a SessionID element filled. On the other hand, in case that an ISO 15118-20 standard is used, the CS may modify each received CertificateInstallationRes message or generate a CertificateInstallationRes message for each information received from the CSMS so that the message contains correct values for the elements of SessionID, EVSEProcessing, RemainingCerts, EVSEStatus and ResponseCode.

Figure 14:
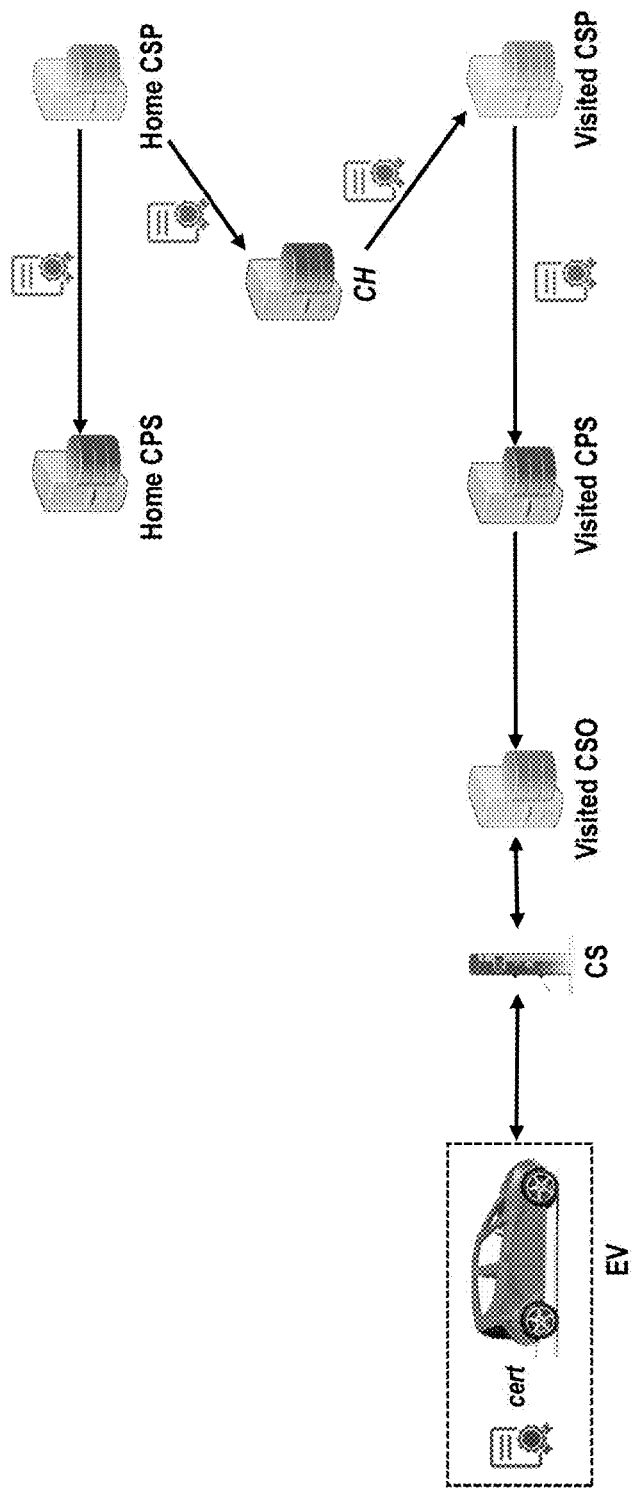
FIG. 14 illustrates a delivery path of the Contract Certificate from the home CSP to the EV through the indirect roaming according to an exemplary embodiment of the present disclosure.

FIG. 14 illustrates a delivery path of the Contract Certificate from the home CSP to the EV through the indirect roaming according to an exemplary embodiment of the present disclosure.

In the present embodiment, it is assumed that the Contract Certificate stored in the home CPS is to be installed in the EV or a previously installed certificate in the EV is to be updated with the Contract Certificate. Also, it is assumed that the EV has visited the CS connected to the visited CSO belonging to a network of the visited CSP. If the home CSP and the visited CSP have an indirect roaming contractual relationship through the clearing house, however, the EV may install the Contract Certificate stored in the home CPS or update the previously installed certificate with the Contract Certificate by the indirect roaming through the clearing house.

Figure 15:
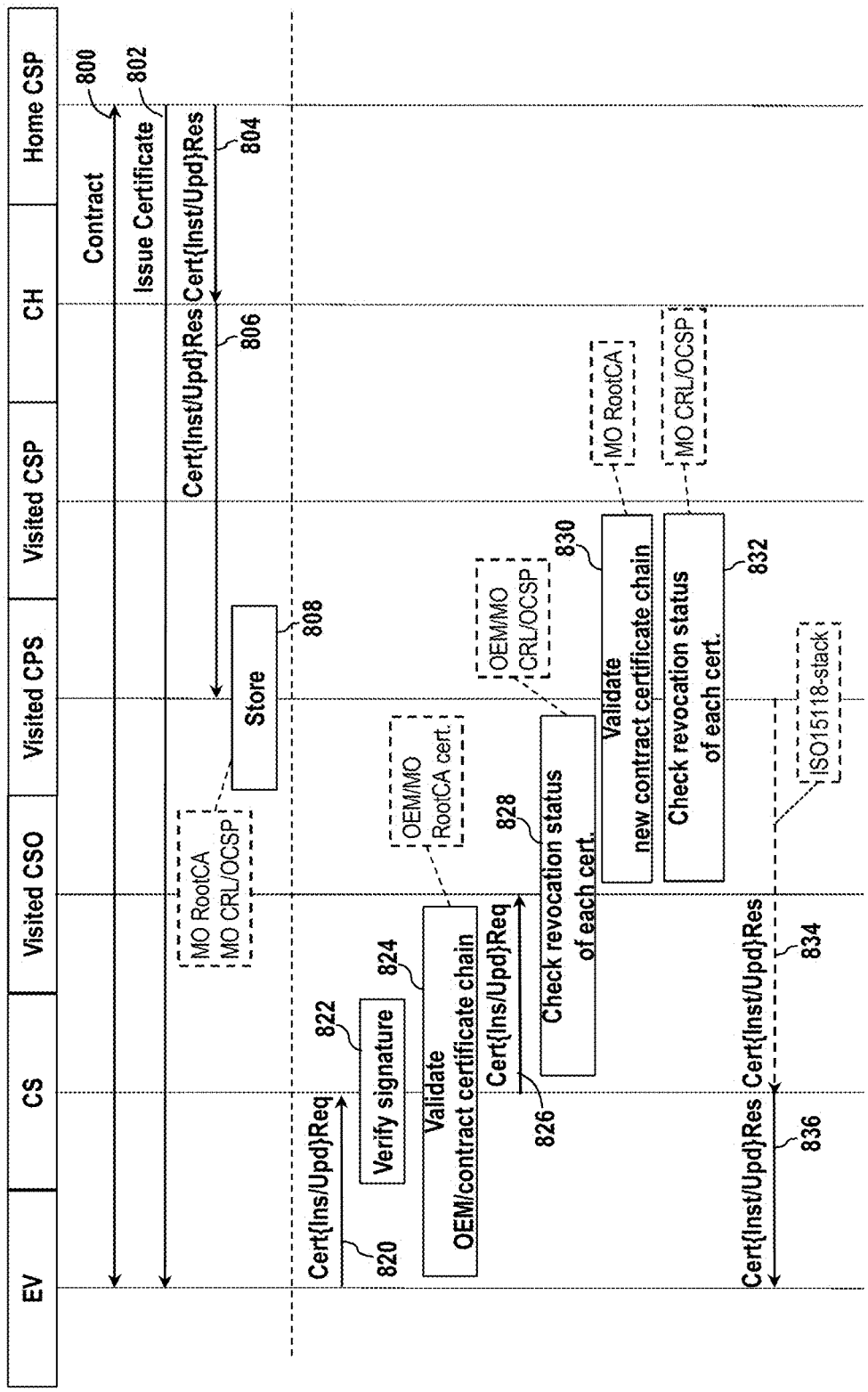
FIG. 15 is a sequence diagram illustrating the certificate delivery process shown in FIG. 14 in more detail.

FIG. 15 is a sequence diagram illustrating the certificate delivery process shown in FIG. 14 in more detail. According to the embodiment shown in FIG. 15, the visited CSP and the home CSP do not communicate directly, but through the clearing house during the process of storing the certificate in the CSPs in advance.

First, the EV owner and the home CSP operator may conclude a charging service contract (operation 800). After the conclusion of the contract, the home CSP may create the Contract Certificate for the EV (operate 802). The created certificate includes the public key of the EV, the hash of the public key, and the message signature obtained by encrypting the hash with the private key of the MO SubCA (i.e., MO SubCA 1 or MO SubCA 2). The certificate may be distributed to all visited CSPs having roaming contracts with the home CSP (operations 804-808).

In an exemplary embodiment, the operations 800-808 may be performed in advance before the EV transmits the certificate installation request message (CertificateInstallationReq) or the certificate update request message (CertificateUpdateReq) to the visited CSO through the CS. That is, in order to support the EV requesting the installation or the of the certificate from the visited CSP, the home CSP may distribute the certificate installation package in advance to all visited CSPs having the contractual relationships, so that the visited CSPs can store the certificate installation package in the CPS and support the installation or update of the certificate of the EV in response to the request of the EV. At this time, the certificate installation package may be distributed in advance to all CSPs regardless of the contractual relationship in consideration of a possibility of the on-the-fly roaming. The certificate installation package may include the contract certificate chain and the eMAID account information, and may further include the certificate revocation list (CRL) and the access information to the OCSP server. The transfer of the certificate installation package between the CSPs may be performed directly or through the clearing house as described below.

More specifically, after the home CSP creates the Contract Certificate in the operation 804, the certificate installation response message (CertificateInstallationRes) or the certificate update response message (CertificateUpdateRes) including the certificate installation package is distributed to all visited CSPs having contractual relationships with the home CSP over secure channels. At this time, the home CSP or the clearing house may validate the contract certificate chain, check the revocation status of the contract certificate chain, check the status of the eMAID account, and check if the contract can be authorized for the service. If the verifications show that there is no problem with the contract certificate chain, the eMAID account, and the contract, the certificate package may be distributed to all visited CSPs. Upon completion of the distribution, the home CSP sends a status code of the certificate chain and result codes for the account and authorization to the clearing house. For this distribution process, the home CSP may maintain the list of the visited CSPs, if any, having the direct roaming contracts with the home CSP. In addition, the home CSP may maintain the list of the clearing houses, if any, having the roaming contracts for the certificate installation with the home CSP. The communications for distributing the certificate package may happen over roaming endpoints. On the other hand, upon receiving the certificate installation package, the visited CSPs may distribute the package to their CPSs through the same procedure as is performed when the visited CSP issues the certificates for their own user.

Afterwards, when the EV requests to install or update the certificate, the visited CSO may retrieve the certificate installation package from the visited CPS and forward the certificate installation package to the EV. The installation or update process may have no difference between the non-roaming situation and the roaming situations. Operations 820 through 836 in FIG. 15 show this process.

Specifically, in operation 820, the EV may transmit the certificate installation or update request message (Cert{Ins/Upd}Req) to the CS. In case of the certificate installation request message, the EV may send the OEM provisioning certificate chain to the CS through the communications conforming to the ISO 15118 standard. Meanwhile, the certificate update request message may include the contract certificate chain. Upon receiving the certificate installation or update request message (Cert{Ins/Upd}Req), the CS may verify the signature in the request message (operation 822). The CS may verify the message signature by decrypting the signature included in the request message with the public key to restore the hash and comparing the restored hash with the hash included in the request message.

Subsequently, the CS validates the received certificate chain (operation 824). In case of the certificate installation, the OEM provisioning certificate is validated in a manner described above. In case of the certificate update, the contract certificate chain is validated as above. Then, the CS transfers the certificate installation or update request message (Cert{Ins/Upd}Req) to the visited CSO (operation 826). The visited CSO may check the revocation status of each certificate in the OEM provisioning certificate chain or the contract certificate chain in a manner described above (operation 828).

The visited CPS validates the new contract certificate chain stored in the operation 808 based on the MO RootCA Certificate (operation 830). The visited CPS checks the revocation status of each certificate in the new contract certificate chain (operation 832). The revocation status or the validity of the certificate may be checked by using the certificate revocation list (CRL) received from the MO RootCA or by querying the certificate status from the OCSP server associated with the MO RootCA.

After the new contract certificate chain is validated in the operation and if there is no problem with the validity of each certificate in the new contract certificate chain, the visited CPS sends the certificate installation/update response (Cert{Ins/Upd}Res) message to the CS (operation 834). The CS may send the new contract certificate package to the EV, so that the EV may install or update the new certificate (step 836).

Though the CS sends, in the operation 836, the data received from the visited CPS in the operation 834 to the EV as described above, all certificate data received by the CS is not necessarily transmitted to the EV. That is, the CS may receive the certificate on its own needs to install the certificate or update a previously installed certificate. Also, the CS needs to maintain multiple CA certificates and relevant information for the secure operation and may update the CA certificates and relevant information. The process that the CS installs or updates the CA certificates on its own needs according to the present embodiment is similar to that described with reference to FIG. 13, and a detailed description thereof will be omitted for simplicity.

It should be noted that the roles of the visited CSP and the home CSP may be interchanged in FIGS. 13 and 15. In addition, one CSP may act as a visited CSP for another CSP while acting as the home CSP for the other CSP.

Figure 16:
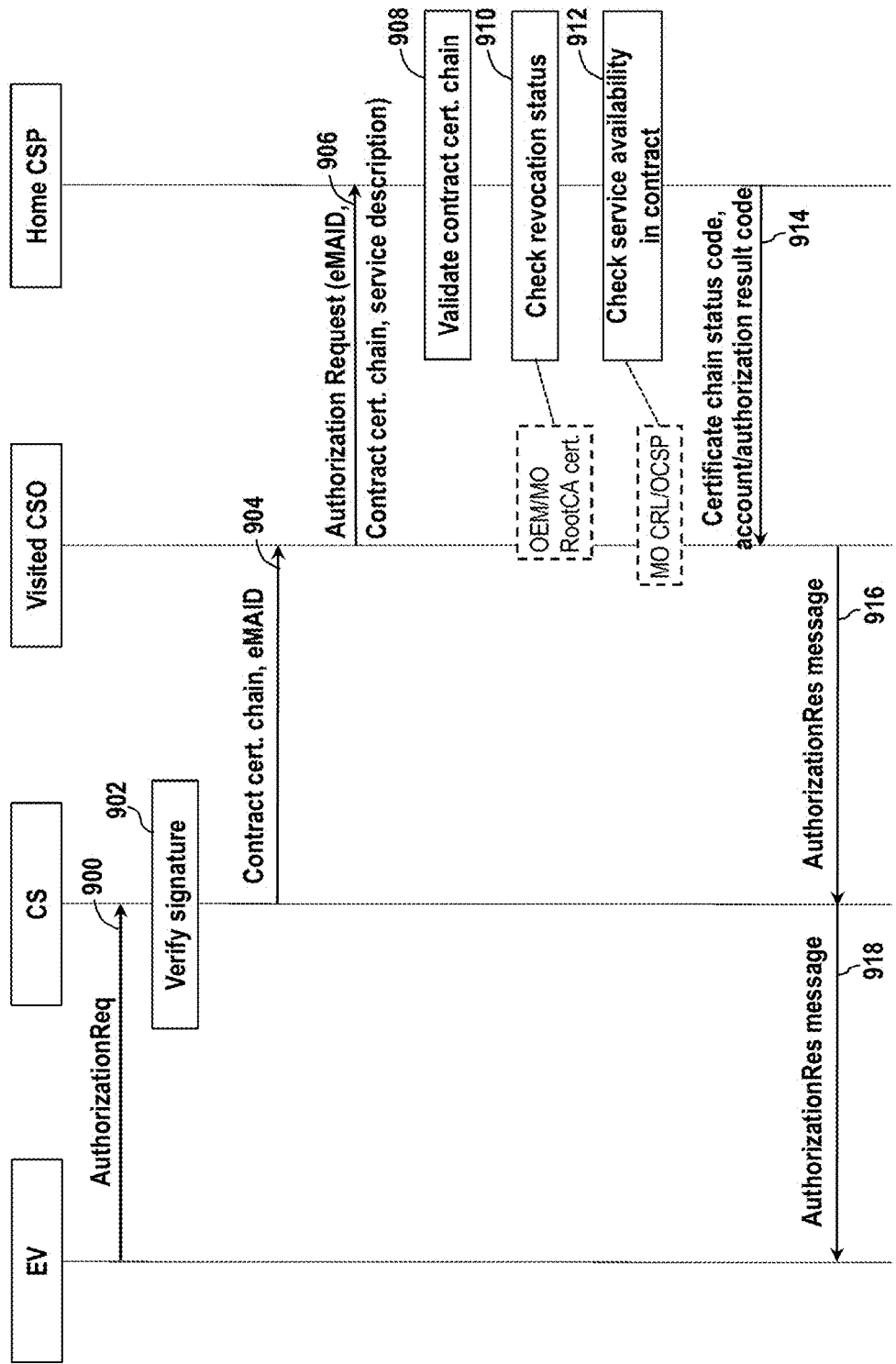
FIG. 16 is a sequence diagram illustrating a service authorization process according to a contract in accordance with an exemplary embodiment of the present disclosure.

FIG. 16 is a sequence diagram illustrating a service authorization process according to a contract in accordance with an exemplary embodiment of the present disclosure.

First, an EV that wishes to get authorized for a service through the PnC mechanism may transmit an authorization request message (AuthorizationReq) to a visited CS (operation 900). At this time, the EV may provide the contract certificate chain to the CS by communications conforming to the ISO 15118 standard. The CS may verify the message signature by decrypting the signature in the authorization request message with the public key of the EV to restore the hash and comparing the restored hash with the hash included in the authorization request message (operation 902).

Subsequently, the CS may deliver the contract certificate chain and the eMAID included in the authorization request message to the visited CSO (operation 904). The visited CSO determines whether the CSP contracted with the EV is inside or outside the network to which the visited CSO belongs. The visited CSO then identifies how to directly contact the home CSP or the clearing house to get a roaming assistance. Next, the visited CSO transmits an authorization request including EV-related information to the home CSP or the clearing house (operation 906). The EV-related information includes the eMAID and the contract certificate chain, and may further include a service description to authorize the EV. In case that the destination of the EV-related information transmitted by the visited CSO in the operation 906 is the clearing house, the clearing house forwards the EV-related information to the corresponding home CSP.

Next, the home CSP checks a complete contract certificate chain including the MO RootCA Certificate having acquired already, and validates the contract certificate chain (operation 708). The contract certificate chain may be validated by comparing owner information of each certificate with issuer information of its SubCA certificate sequentially from the MO RootCA Certificate through the SubCA certificates including MO SubCA 1 Certificate and MO SubCA 2 Certificate to the Contract Certificate which is the leaf certificate to verify the integrity and reliability of each certificate in the contract certificate chain. Then, the home CSP checks the revocation status of each certificate in the contract certificate chain (operation 910). The revocation status or the validity of the certificate may be checked by using the certificate revocation list (CRL) received from the MO RootCA or by querying the certificate status from the OCSP server associated with the MO RootCA. The home CSP may additionally check the status of the eMAID account and if the contract can be authorized for the requested service (operation 912).

Depending on check results, the home CSP may reply a status code indicating a status of the contract certificate chain and a result code for the account and the authorization to the visited CSO (operation 914). The status code can be one of 'OK', 'Expired', 'Revoked', 'Invalid_chain', and 'Unkown_error', for example. The result code can be one of 'OK', 'NO_CONTRACT', 'CONTRACT_TERMINATED', 'CONTRACT_SUSPENDED', 'NOT_AUTHORIZED', and 'Unkown_error', for example.

The visited CSO may notify an authorization result to the CS, which may notify again the authorization result to the EV through communications conforming to the ISO 15118 standard (operations 916 and 918).

As such, if the CSP having a contractual relationship with the EV is in a direct roaming contractual relationship with the visited CSO or in an indirect roaming contractual relationship through the clearing house, the visited CSO may perform the authorization process by exchanging necessary information needed to authorize the EV with the home CSP directly or indirectly via the clearing house.

FIG. 16 illustrates just an exemplary embodiment of the present disclosure, and the embodiment may be modified variously. For example, the verification of the message signature in the operation 902 may be performed by the visited CSO rather than the CS in an alternative embodiment. Further, the validation of the contract certificate chain in the operation 908 may be performed by the visited CSO or the CS rather than the home CSP. Besides, the subject performing each operation in the embodiment of FIG. 16 may be changed similarly to FIGS. 7-11 depending on the roaming condition.

Figure 17:
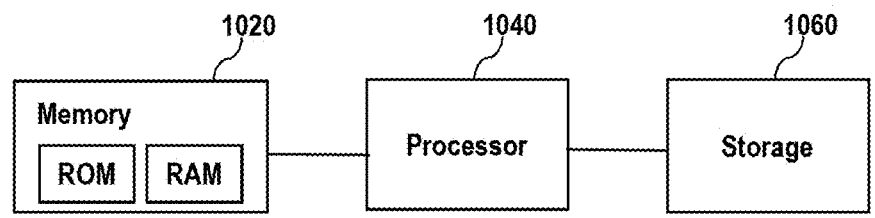
FIG. 17 is a block diagram of the CSP 220 according to an exemplary embodiment of the present disclosure.

FIG. 17 is a block diagram of the charging service provider (CSP) 220 according to an exemplary embodiment of the present disclosure. The CSP 220 according to an exemplary embodiment of the present disclosure may include at least one processor 1020, a memory 1040, and a storage 1060.

The processor 1020 may execute program instructions stored in the memory 1040 and/or the storage 1060. The processor 1020 may be at least one central processing unit (CPU), a graphics processing unit (GPU), or any other kind of dedicated processor suitable for performing the processes according to the present disclosure.

The memory 1040 may include, for example, a volatile memory such as a read only memory (ROM) and a non-volatile memory such as a random access memory (RAM). The memory 1040 may load the program instructions stored in the storage 1060 to provide to the processor 1020.

The storage 1060 may include an intangible recording medium suitable for storing the program instructions and data files. Any device capable of storing data that may be readable by a computer system may be used for the storage. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD).

The storage 1060 stores the program instructions. In particular, the program instructions may include instructions for supporting the installation of the contract certificate according to the present disclosure. The program instructions for supporting the installation of the contract certificate may include instructions for generating a first contract certificate for a first EV and transmitting the first contract certificate to a first visited CSP so as to enable the first contract certificate to be installed in the first EV via the first visited CSP; instructions for receiving a second contract certificate for a second EV from a second visited CSP and forwarding the second contract certificate to a CPS to enable the CPS to store the second contract certificate; and instructions, when a contract certificate installation request is received from the second EV in a roaming situation where the second EV stays in a service network of the charging service providing device, for making the second contract certificate stored in the CPS to be transmitted to and installed in the second EV. Also, the program instructions may include at least some of the instructions necessary for implementing the process shown in FIG. 12. The program instructions may loaded into the memory 1040 under a control of the processor 1020 and be executed by the processor 1020 to implement the method according to the present disclosure.

As mentioned above, the apparatus and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the apparatus may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of the functions of the methods described herein. The field-programmable gate array may be operated along with a microprocessor to perform one of the methods described herein. In general, the methods may be performed preferably by a certain hardware device.

While the present disclosure has been described above with respect to exemplary embodiments thereof, it will be apparent to those skilled in the art that various changes and modifications may be made without departing from the spirit and scope of the present disclosure defined in the following claims.

What is claimed is:

1. A method of supporting an installation of a contract certificate related information in a charging station operating device (CSO), comprising:
providing, by a charging service providing device (CSP) having a contractual relationship with a first electric vehicle (EV), first contract certificate related information for the first electric vehicle (EV); and
transmitting, by the CSP, the first contract certificate related information to a first external charging service providing device (CSP) associated with a first visit CSO associated with a first visited charging station (CS) presently visited by the first EV based on a first roaming contract established between the CSP and the first visited CSO to enable the first contract certificate related information to be installed in the first visited CSO and to enable the first visited CSO to validate second contract certificate related information received from the first EV based on the first contract certificate related information.

2. The method of supporting the installation of the contract certificate related information as claimed in claim 1, wherein the first external CSP includes all external CSPs having respective roaming contracts with the CSP.

3. The method of supporting the installation of the contract certificate related information as claimed in claim 2, wherein the first external CSP includes all external CSPs.

4. The method of supporting the installation of the contract certificate related information as claimed in claim 1, further comprising:
sending a request to release an installation standby to the first external CSP when a predetermined time elapsed after transmitting the first contract certificate related information to the first external CSP or when the first contract certificate related information is installed in the first EV.

5. The method of supporting the installation of the contract certificate related information as claimed in claim 1, wherein transmitting the first contract certificate related information to the first external CSP comprises:
generating a certificate installation package comprising a contract certificate chain including a first contract certificate and eMAID information; and
transmitting the certificate installation package to the first external CSP.

6. The method of supporting the installation of the contract certificate related information as claimed in claim 5, wherein the certificate installation package comprises a certificate revocation list associated with the first contract certificate and access information to an Online Certificate Status Protocol (OCSP) server.

7. The method of supporting the installation of the contract certificate related information as claimed in claim 1, further comprising:
receiving, by the CSP, a second contract certificate related information for a second EV from a second external CSP having a second contractual relationship with the second EV;
forwarding, by the CSP, the second contract certificate related information to a certificate provisioning service device (CPS) to enable the CPS to store the second contract certificate related information; and
transmitting, by the CPS, the second contract certificate related information stored in the CPS to the second EV via a second visited CSO presently visited by the second EV in a roaming situation when the second EV stays in a service network of the CSP, to enable the second contract certificate related information stored in the CPS to be installed in the second EV, based on a contract certification installation from the second EV.

8. The method of supporting the installation of the contract certificate related information as claimed in claim 7, wherein the second external CSP is one of all external CSPs having respective roaming contracts with the CSP.

9. The method of supporting the installation of the contract certificate related information as claimed in claim 7, wherein the transmitting of the second contract certificate related information to the second EV comprises:
notifying a completion of an installation to the second external CSP after the second contract certificate related information is installed in the second EV.

10. A charging service providing device, comprising:
a processor; and
a memory storing at least one program instruction to be executed by the processor,
wherein the at least one program instruction, when executed by the processor, causes the processor to:
provide first contract certificate related information for a first electric vehicle (EV);
transmit the first contract certificate related information to a first external charging service providing device (CSP) associated with a first visited charting station operating device (CSO) associated with a first visited charging station (CS) presently visited by the first EV, to enable a first contract certificate to be installed in the first visited CSO via the first external CSP;
receive second contract certificate related information for a second EV from a second external CSP; and
forward the second contract certificate related information to a certificate provisioning service device (CPS) to enable the CPS to store the second contract certificate related information and to enable the second certificate related information stored in the CPS to be transmitted and installed in the second EV, based on a contract certificate installation request received from the second EV.

11. The charging service providing device as claimed in claim 10, wherein the first external CSP includes all external CSPs having respective roaming contracts with the charging service providing device,
wherein the second external CSP is one of the all external CSPs having respective roaming contracts with the charging service providing device.

12. The charging service providing device as claimed in claim 11, wherein the first external CSP includes all external CSPs,
wherein the second external CSP is one of the all external CSPs.

13. The charging service providing device as claimed in claim 10, wherein the program instruction causing the processor to transmit the first contract certificate related information to the first external CSP comprises program instructions causing the processor to:
send a request to release an installation standby to the first external CSP when a predetermined time elapsed after transmitting the first contract certificate related information to the first external CSP or when the first contract certificate related information is installed in the first EV.

14. The charging service providing device as claimed in claim 13,
wherein the program instruction causing the processor to forward the second contract certificate related information to be transmitted to and installed in the second EV comprises program instructions causing the processor to:
notify a completion of an installation to the second external CSP after the second contract certificate related information is installed in the second EV.

15. The charging service providing device as claimed in claim 10, wherein the program instruction causing the processor to transmit the first contract certificate related information to the first external CSP comprises program instructions causing the processor to:
make a certificate installation package comprising a contract certificate chain including the first contract certificate and eMAID information; and
transmit the certificate installation package to the first external CSP.

16. The charging service providing device as claimed in claim 15, wherein the certificate installation package comprises a certificate revocation list associated with the first contract certificate and access information to an Online Certificate Status Protocol (OCSP) server.

17. A method of authorizing a charging of an electric vehicle (EV) in a roaming environment, comprising:
- providing, by a first charging service providing device (CSP) having a first contractual relationship with a first electric vehicle (EV), a first contract certificate related information for the first EV,
- transmitting, by the first CSP, the first contract certificate related information to a first external CSP associated with a first visited charging station operating device (CSO) based on a first roaming contract established between the first CSP and the first visited CSO, to enable the first contract certificate related information to be installed in the first visited CSO via the first external CSP;
- receiving, by the first visited CSO, an authorization request including second contract certificate related information stored in the first EV from the first EV in a roaming situation where the first EV visits a first visited charging station (CS) associated with the first visited CSO; and
- validating, by the first visited CSO, the second contract related information based on the first contract certificate related information.

18. The method of claim 17, wherein the transmitting of the third contract certificate related information to be transmitted to and installed in the second EV comprises:
- notifying a completion of an installation to the second external CSP after the third contract certificate related information is installed in the second EV.

19. The method of claim 17, wherein receiving the third contract certificate related information from the second external CSP comprises:
- receiving a certificate installation package comprising a contract certificate chain including a second contract certificate and eMAID information.

20. The method of claim 17, further comprising:
- receiving, by the first CSP, a third contract certificate related information for a second EV from a second external CSP having a second contractual relationship with the second EV;
- forwarding, by the first CSP, the third contract certificate related information to a certificate provisioning service (CPS) to enable the first CPS to store the third contract certificate related information; and
- transmitting, by the first CPS, the third contract certificate related information stored in the first CPS to the second EV via a second visited CSO presently visited by the second EV in a roaming situation, based on a second roaming contract established between the first CSP and the second external CSP, where the second EV stays in a service network of the first CSP, to enable the third contract certificate related information stored in the CPS to be installed in the second EV, based on a contract certificate installation request received from the second EV.

* * * * *